United States Patent [19]

Dardashti

[11] Patent Number: 5,560,499
[45] Date of Patent: * Oct. 1, 1996

[54] STORAGE AND DISPLAY ASSEMBLY FOR COMPACT DISCS AND THE LIKE

[76] Inventor: Shahriar Dardashti, Atlantic, Inc., 10240 Matern Pl., Santa Fe Springs, Calif. 90670-0399

[*] Notice: The portion of the term of this patent subsequent to Jan. 4, 2014, has been disclaimed.

[21] Appl. No.: 221,878

[22] Filed: Apr. 1, 1994

Related U.S. Application Data

[63] Continuation-in-part of Ser. No. 17,031, Jan. 4, 1994, Pat. No. Des. 361,917, Ser. No. 17,035, Jan. 4, 1994, Pat. No. Des. 361,012, Ser. No. 17,090, Jan. 4, 1994, Pat. No. Des. 359,647, Ser. No. 17,108, Jan. 5, 1994, Pat. No. Des. 361,465, Ser. No. 177,683, Jan. 6, 1994, Ser. No. 17,825, Jan. 21, 1994, Pat. No. Des. 361,464, and Ser. No. 19,744, Mar. 9, 1994, Pat. No. Des. 359,872.

[51] Int. Cl.$^6$ .......................................................... A47F 7/00
[52] U.S. Cl. .................................. 211/40; 211/41; 211/189; D6/407
[58] Field of Search ................................. 211/40, 41, 131, 211/70.1, 72, 73, 189, 194, 915; 206/387, 457; D6/407, 450, 470; D33/14

[56] References Cited

U.S. PATENT DOCUMENTS

| | | | |
|---|---|---|---|
| D. 174,189 | 3/1955 | Oehling | D33/410 U X |
| D. 183,681 | 10/1958 | Deaver | D56/1 |
| D. 263,529 | 3/1982 | Magyar | D6/153 |
| D. 302,278 | 7/1989 | Harrower, III | D17/15 |
| D. 319,741 | 10/1991 | Sylvester | D6/407 |
| D. 329,668 | 10/1992 | Connelly | D21/59 |
| D. 331,166 | 11/1992 | Ohadi | D6/570 |
| D. 333,225 | 2/1993 | Robinson | D6/407 |
| D. 337,919 | 8/1993 | van der Molen | D6/407 |
| D. 340,155 | 10/1993 | Koziol | D6/450 |
| D. 342,172 | 12/1993 | Schonhofen | D6/474 |
| D. 342,395 | 12/1993 | Huang | D6/407 |
| D. 343,074 | 1/1994 | Whiteaker et al. | D6/451 |
| D. 343,533 | 1/1994 | David | D6/407 |
| D. 344,360 | 2/1994 | Yeh | D26/106 |
| 1,650,164 | 11/1927 | Travaglini . | |
| 1,652,114 | 12/1927 | Gestrine . | |
| 2,205,064 | 6/1940 | Irwin | 53/5 |
| 2,222,831 | 11/1940 | Bitney | 248/91 |
| 3,208,598 | 9/1965 | Glassenberg | 211/49 |
| 3,220,557 | 11/1965 | Brandes | 211/40 |
| 3,543,943 | 12/1970 | Joy et al. | 211/131 |
| 3,633,761 | 1/1972 | Holliday | 211/131 U X |
| 3,889,817 | 6/1975 | Berkman | 211/163 U X |
| 3,938,665 | 2/1976 | Rumble | 211/4 |
| 4,056,260 | 11/1977 | David | 366/144 |

(List continued on next page.)

FOREIGN PATENT DOCUMENTS

| | | |
|---|---|---|
| 9106686 | 8/1991 | Germany . |
| 9110569 | 10/1991 | Germany . |
| 9115587 | 2/1992 | Germany . |
| 9200776 | 5/1992 | Germany . |
| 9114424 | 3/1993 | Germany . |
| 9216843 | 3/1993 | Germany . |
| 2070915 | 9/1991 | United Kingdom ........... 211/189 |

OTHER PUBLICATIONS

Advertisement, Probell; Handelsgesellschaft mbH; Hamburg, Germany; Circa. Mar., 1991.
Audio Accessories/CD; Wholesale Price List; Atlantic Representations, Inc.; Effective Sep. 1, 1991; No. PRCD91–D.

(List continued on next page.)

*Primary Examiner*—Robert W. Gibson, Jr.
*Attorney, Agent, or Firm*—Poms, Smith, Lande & Rose, P.C.

[57] ABSTRACT

An assembly for storing and displaying compact discs and the like, including two elongated storage units, each having a column of case-receiving slots, the units being secured in upright parallel relation. Top members are secured to the tops of the units and side members are secured to the lower outside sides. The top and side members together with the storage units form the outline of a readily-recognizable, non-storage unit object. The object is preferably a double-neck guitar with the slots (or slot-defining ribs) forming the frets thereof.

36 Claims, 21 Drawing Sheets

U.S. PATENT DOCUMENTS

| | | | |
|---|---|---|---|
| 4,228,902 | 10/1980 | Schulte | 211/41 |
| 4,293,075 | 10/1981 | Veralrud | 211/40 |
| 4,358,018 | 11/1982 | Wolfe | 211/41 |
| 4,453,785 | 6/1994 | Smith | 312/40 |
| 4,630,737 | 12/1986 | King | 211/40 |
| 4,655,345 | 4/1987 | Drake et al. | 206/309 |
| 4,702,369 | 10/1987 | Philosophe | 206/312 |
| 4,709,815 | 12/1987 | Price et al. | 206/387 |
| 4,730,739 | 3/1988 | Semerau, Jr. | 211/189 |
| 4,762,689 | 8/1988 | Frey et al. | 422/310 |
| 4,819,801 | 4/1989 | Howard | 206/387 |
| 4,872,554 | 10/1989 | Quernemoen | 206/454 |
| 4,911,308 | 3/1990 | Nylund | 211/41 |
| 4,932,522 | 6/1990 | Milovich | 206/309 |
| 4,940,147 | 7/1990 | Hunt | 211/40 |
| 5,054,626 | 1/1991 | Stempinski | 211/40 |
| 5,129,525 | 7/1992 | Maynard, Jr. | 211/133 |
| 5,195,642 | 3/1993 | Dardashti | 211/41 |
| 5,199,577 | 4/1993 | Curtis | 211/41 |
| 5,219,079 | 6/1993 | Nakamura | 211/41 |
| 5,301,819 | 4/1994 | Moeken | 211/40 |
| 5,314,077 | 5/1994 | Theosabrata | 211/40 |
| 5,370,242 | 12/1994 | Huang | 211/40 |

OTHER PUBLICATIONS

CD Storage System; Atlantic Representations, Inc.; Copyright 1991.

Expandable CD Storage System; Atlantic Representations, Inc.; Copyright 1991.

CD Towers; Item B–D; XD61407; Home Decorator Collection Catalogue; p, 22.

Metal Towers–CD, Cassette & VHS Storage System; Atlantic Representations, Inc.; Copyright 1992.

Access Collection Modular Storage System for 31/2 Inch Diskettes and CD Roms; Atlantic Representations, Inc.; Copyright 1993.

Metal Storage System–Towers, Modules, Accessories; Atlantic Representations, Inc.; Copyright 1993.

Wholesale Price List; Atlantic Representations, Inc.; Effective Oct. 1, 1993; No. PRAV93–1.

CD Man; Los Angeles Times Magazine; Feb. 6, 1994; p. 35.

The CD Tower; Phil Patton; The New York Times; Mar. 14, 1994; p. 11.

Model 1108–Floor Lamp/CD Tower; Frontgate–Enhancing Your Home; Winter 1994.

Side by Side CD Storage Rack; Great! American Oak; (Date unknown).

Swivel Base CD Storage Rack; Great! American Oak; (Date unknown).

Registration No. 1,782,606 Jul. 1993 Gibson Guitar Co.

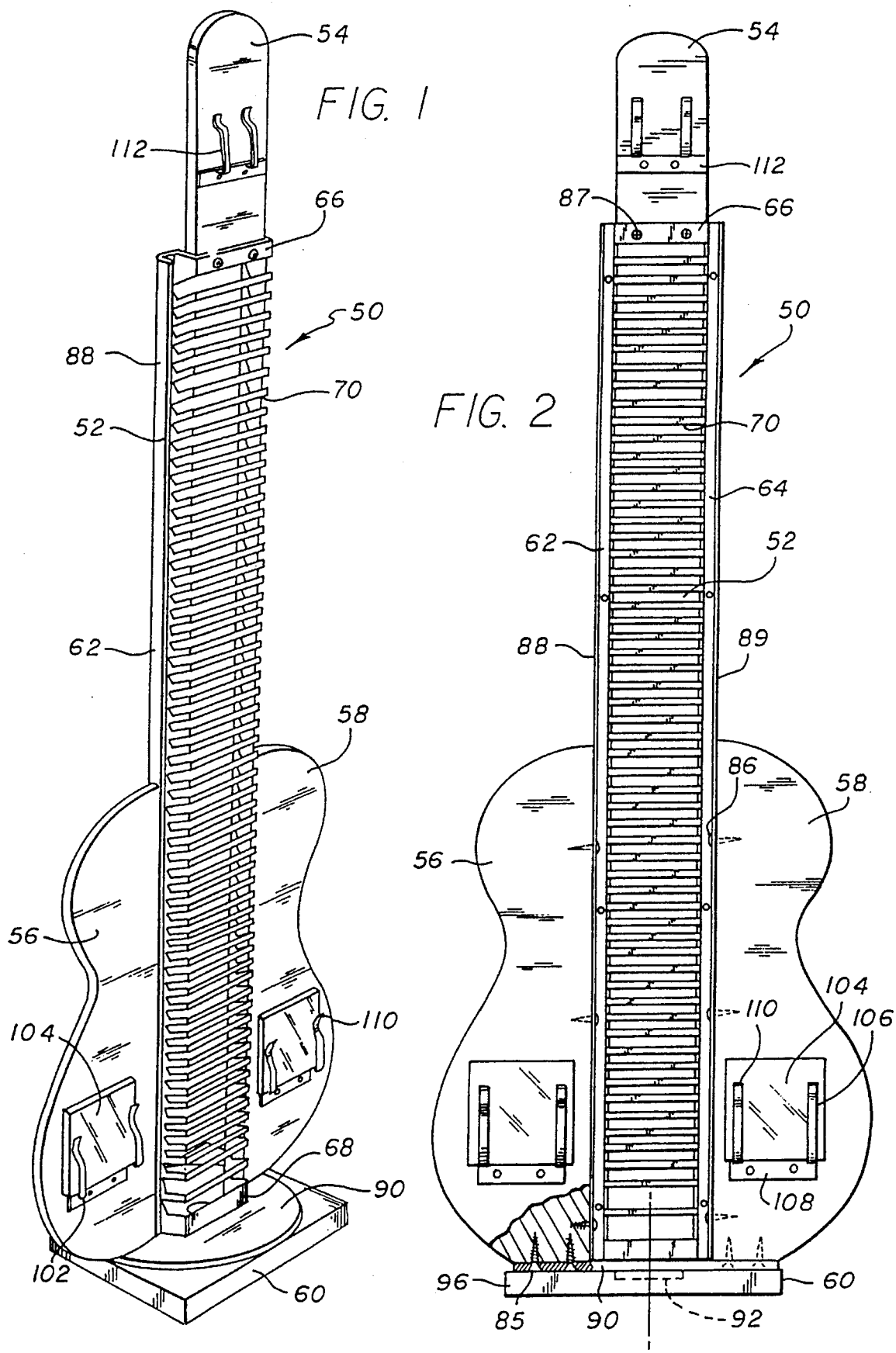

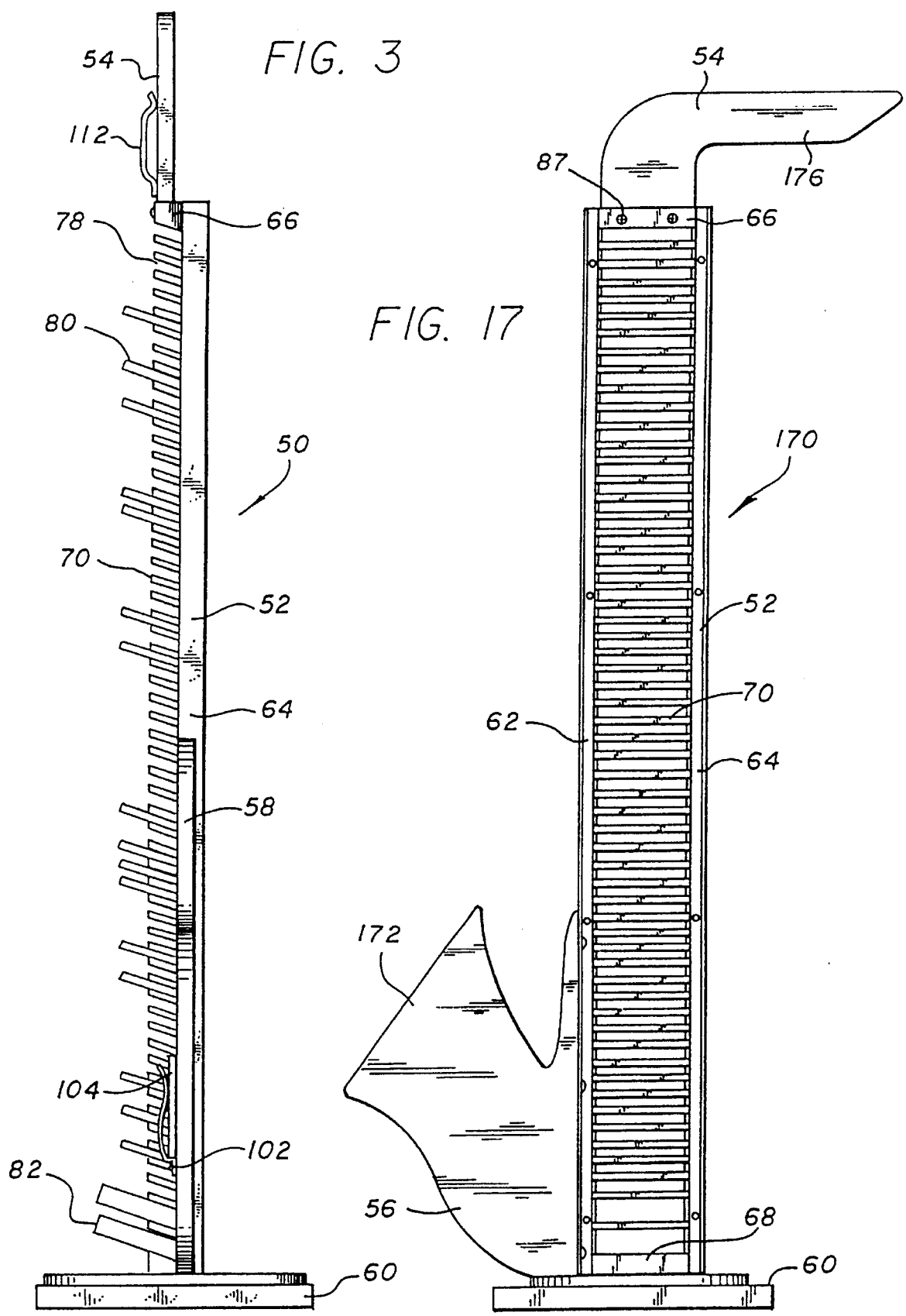

FIG. 4
FIG. 8
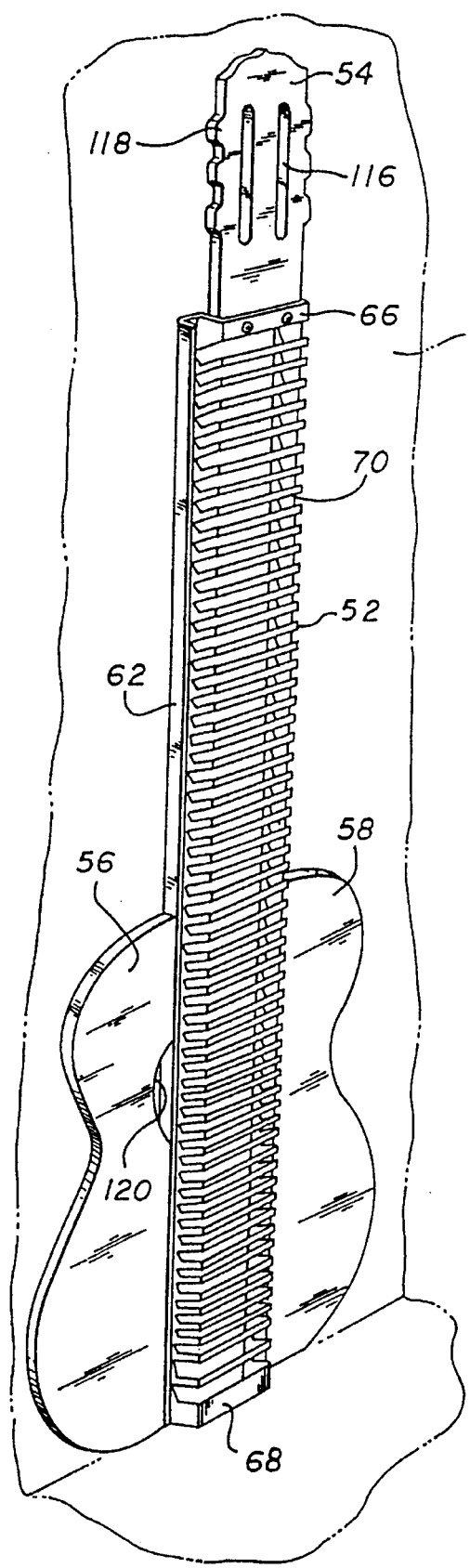
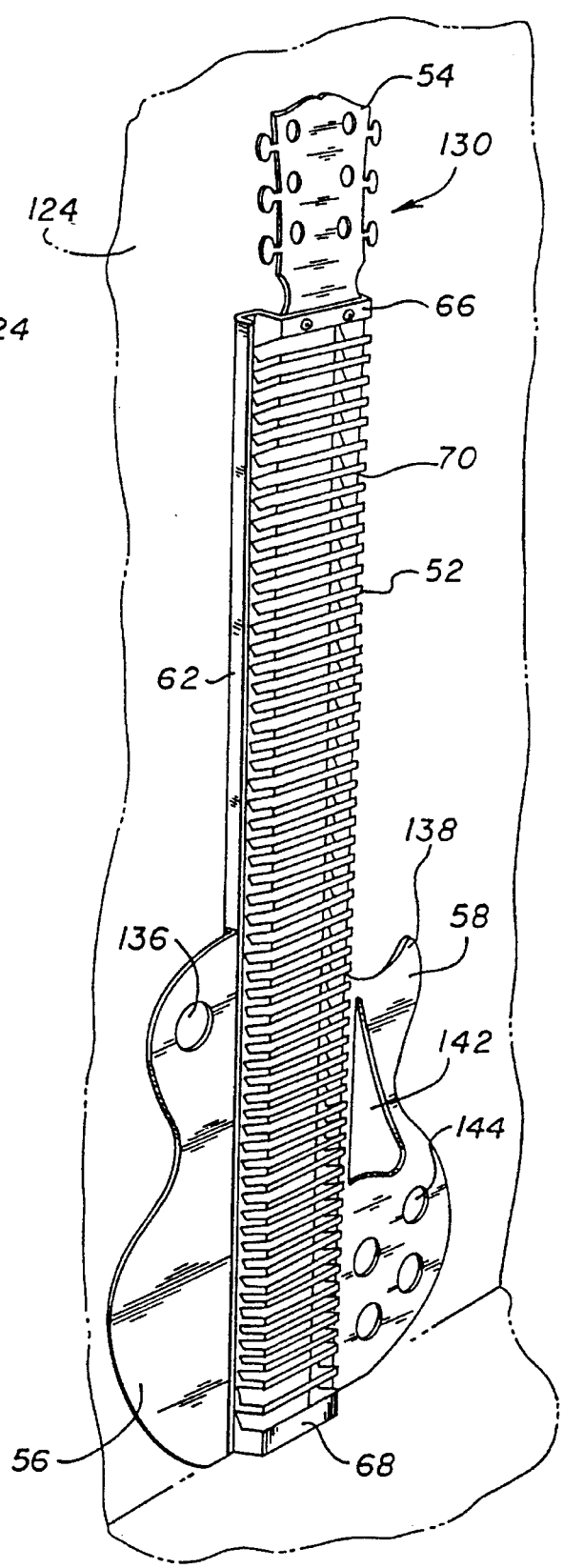

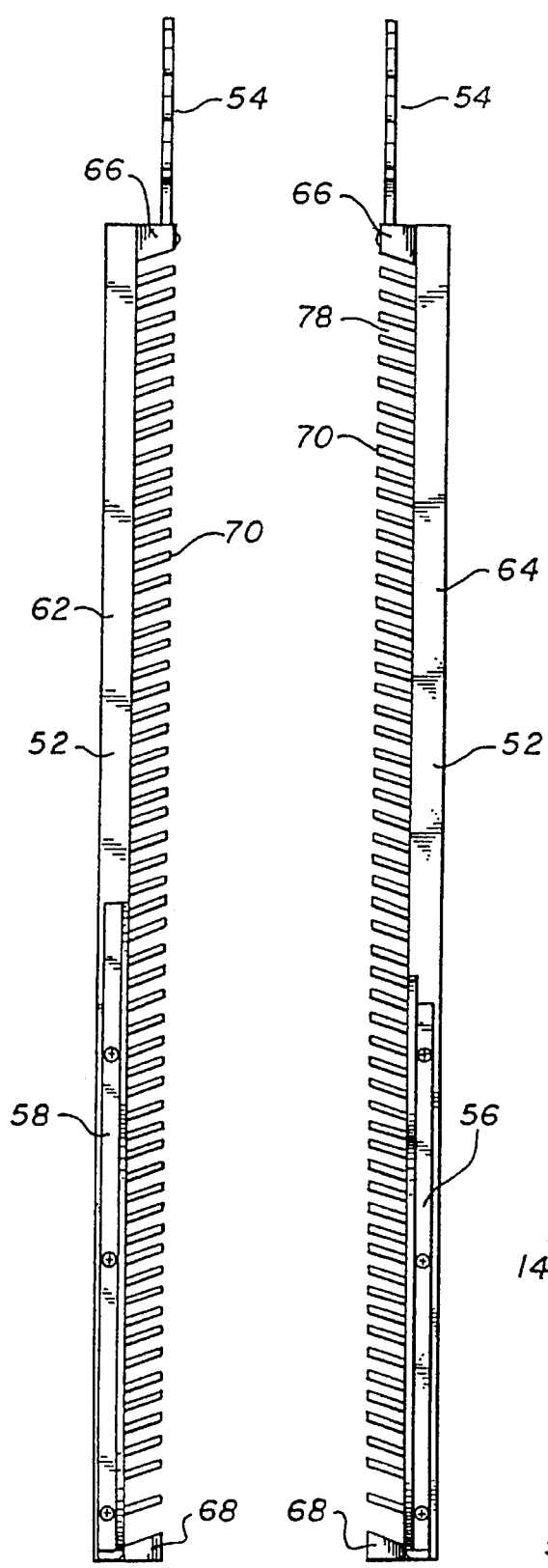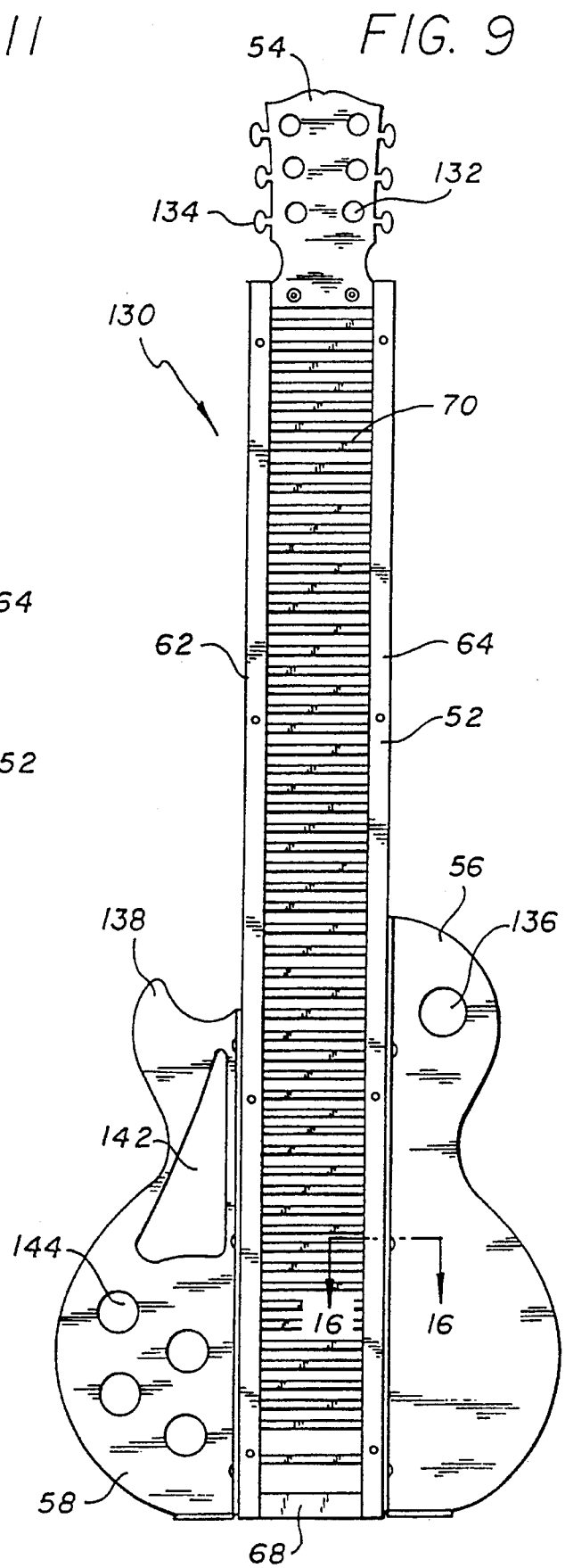

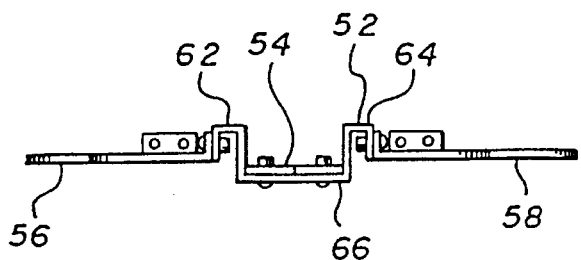
FIG. 12
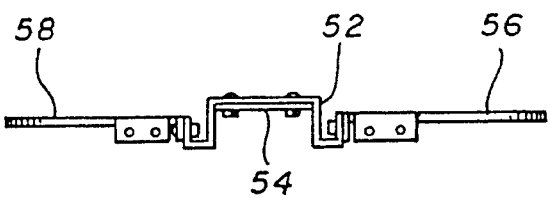
FIG. 13
FIG. 14
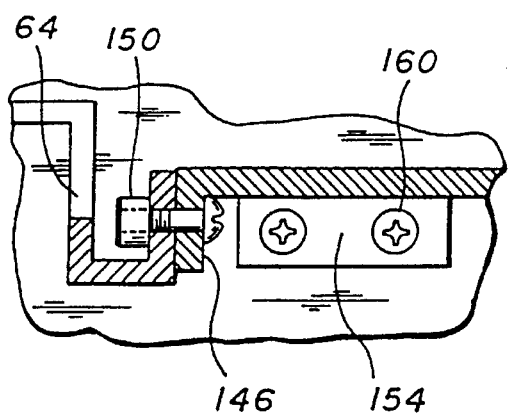
FIG. 16
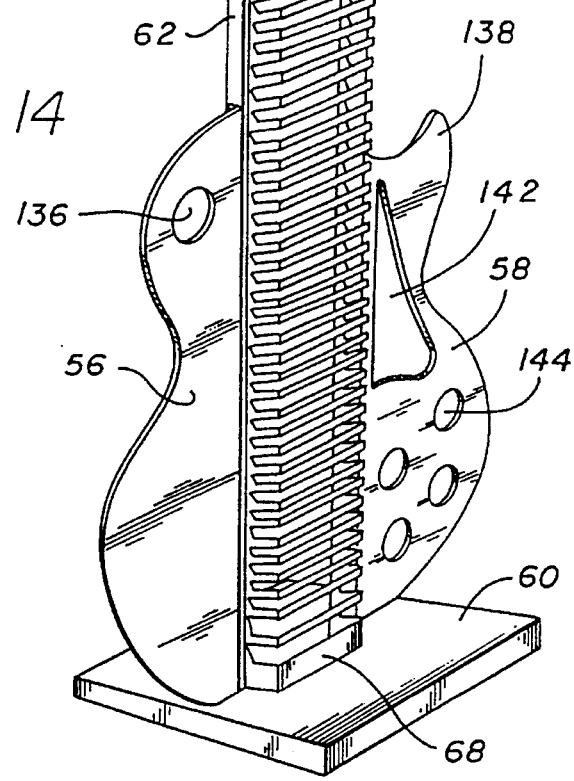

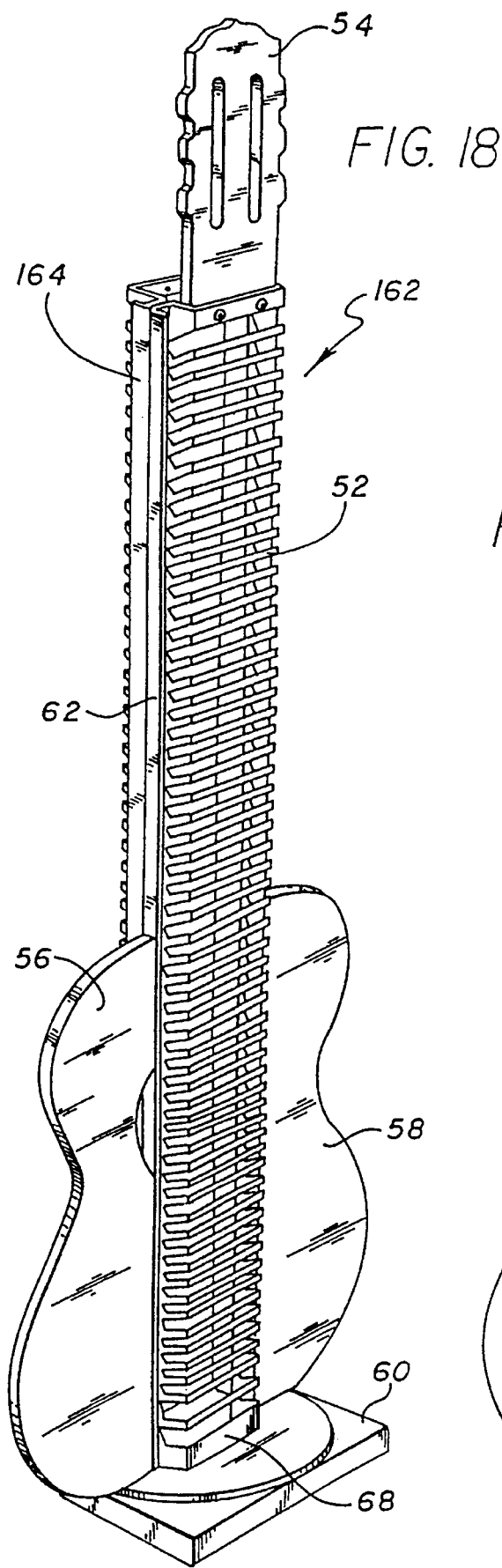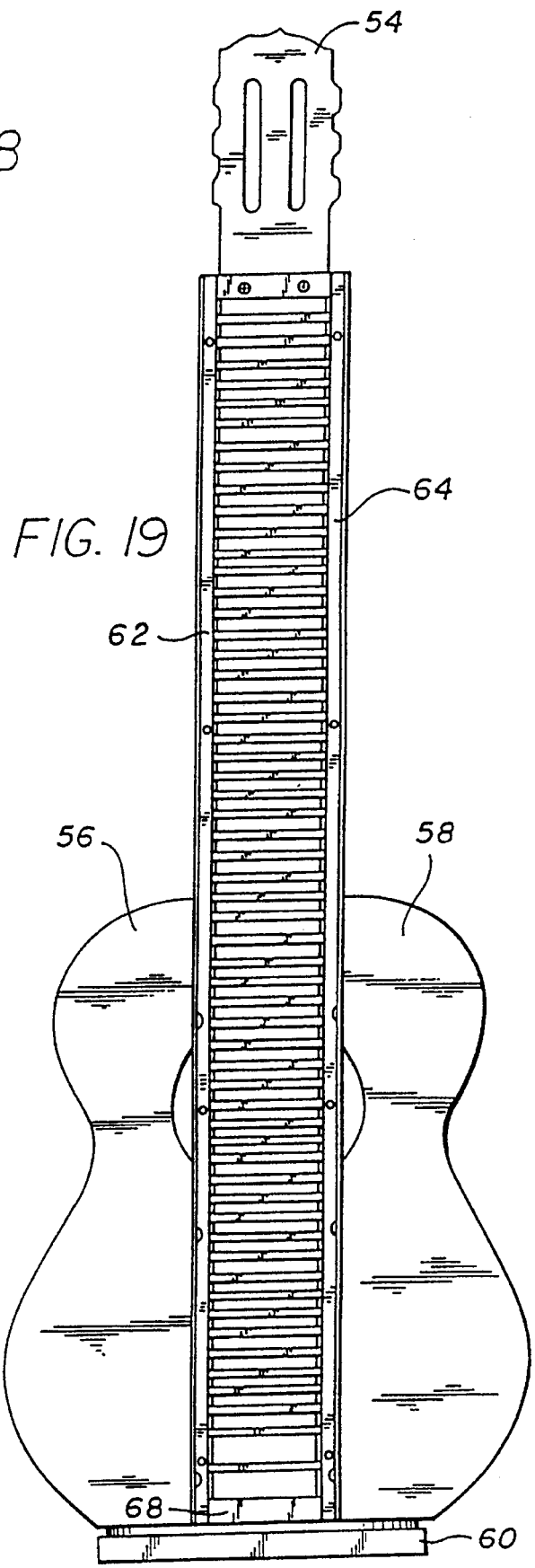

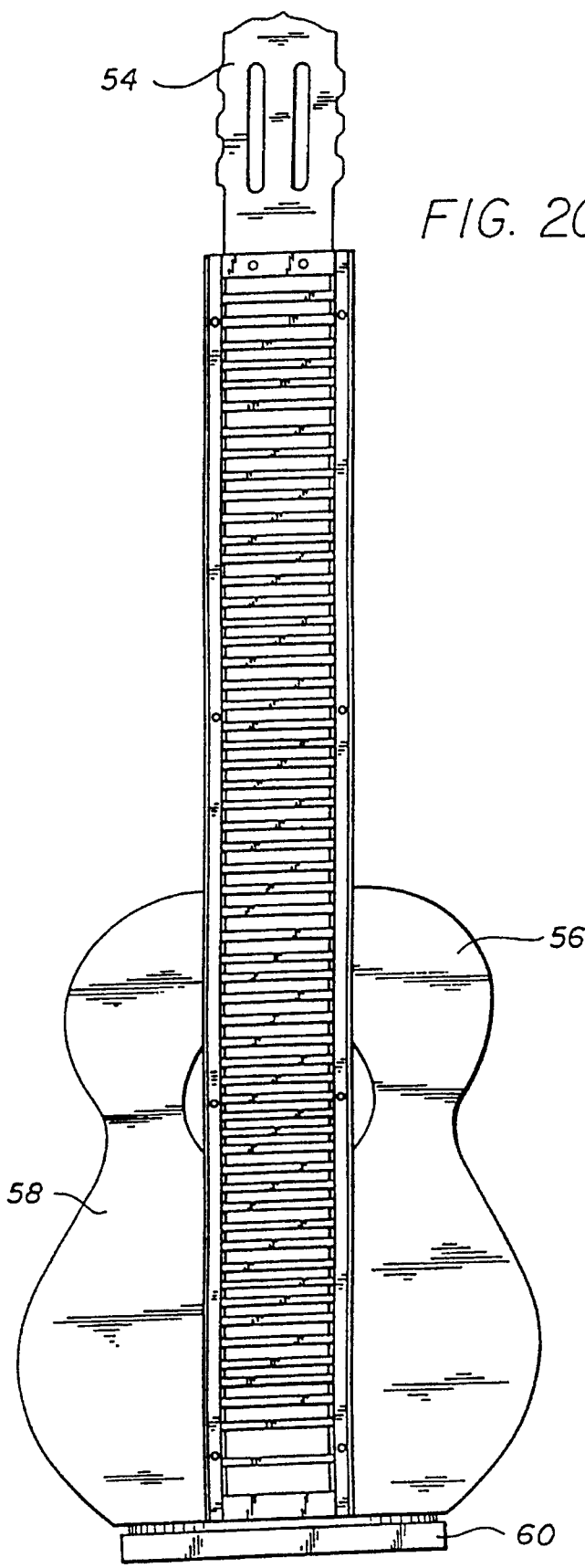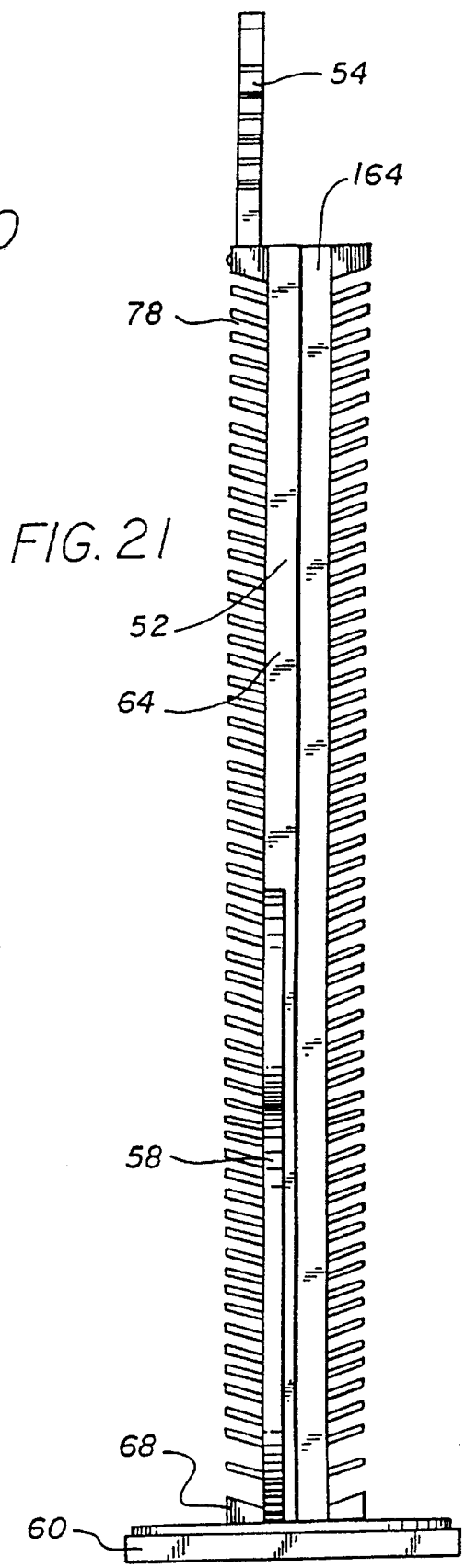

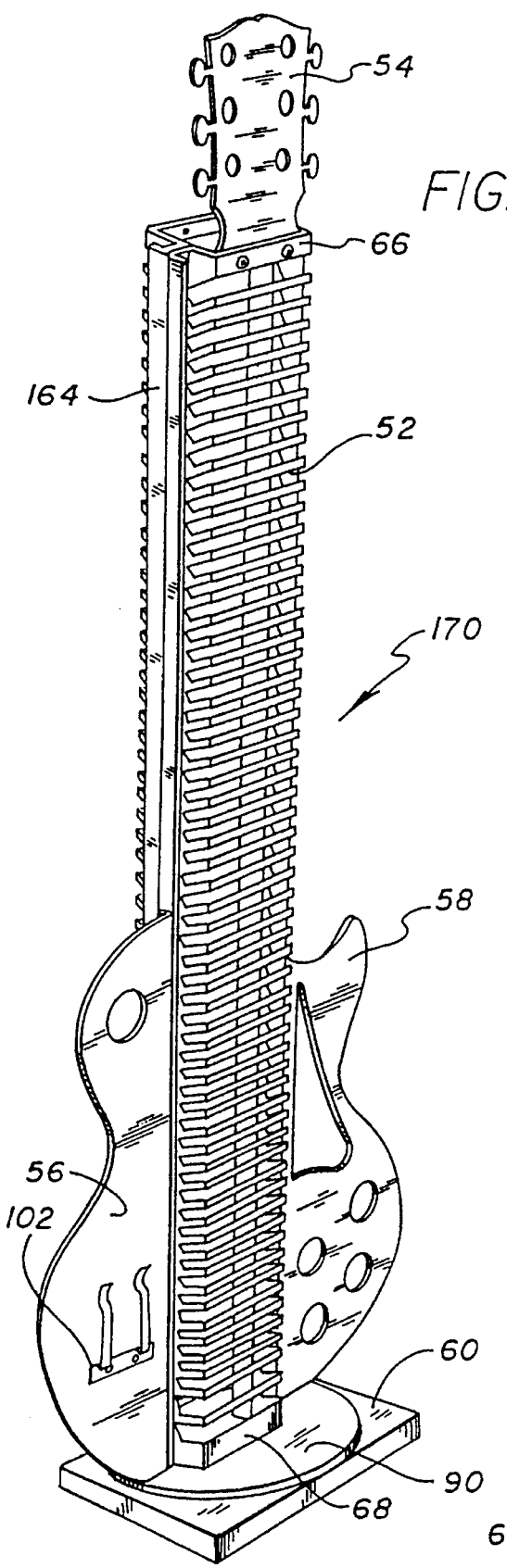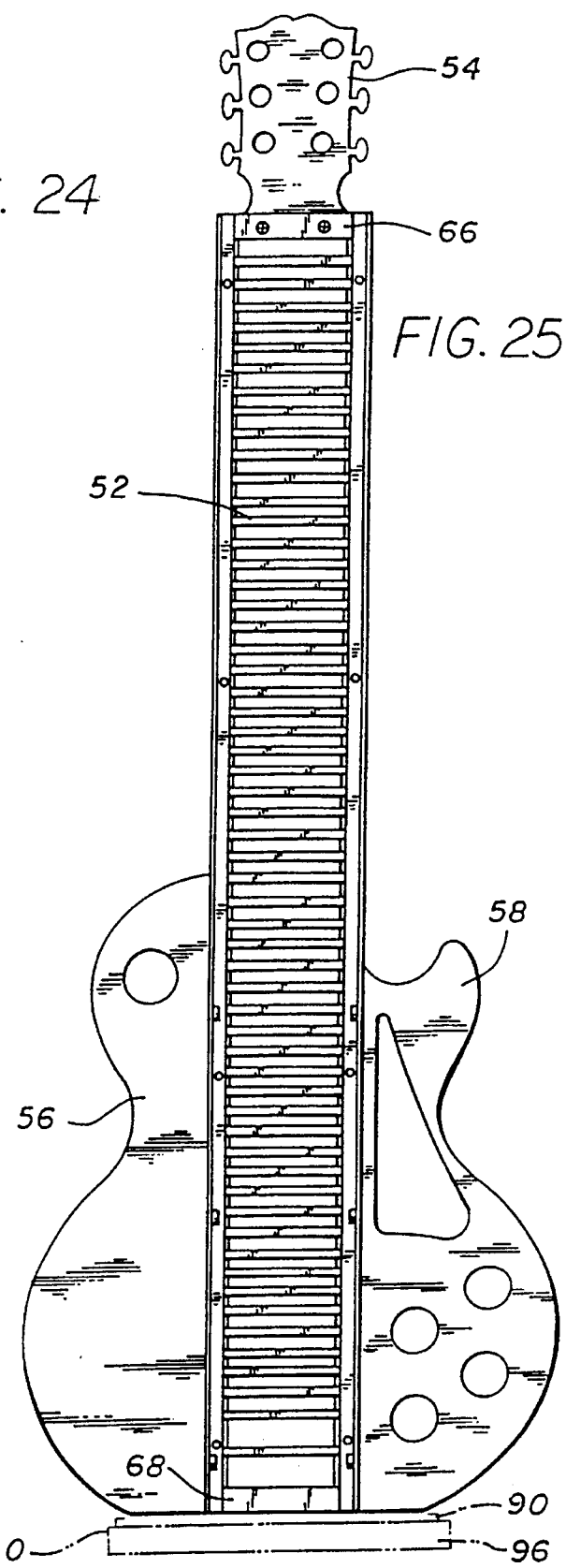

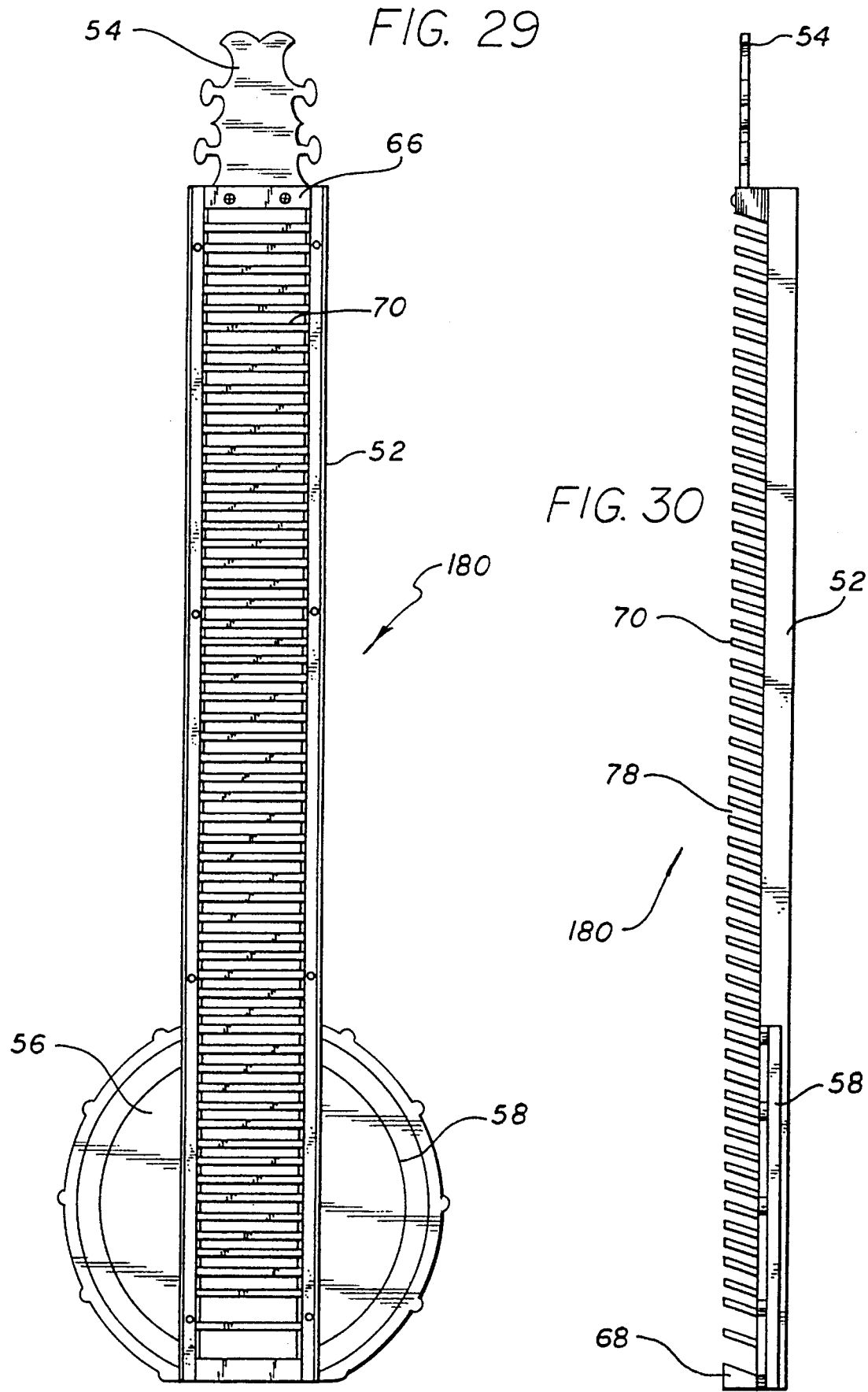

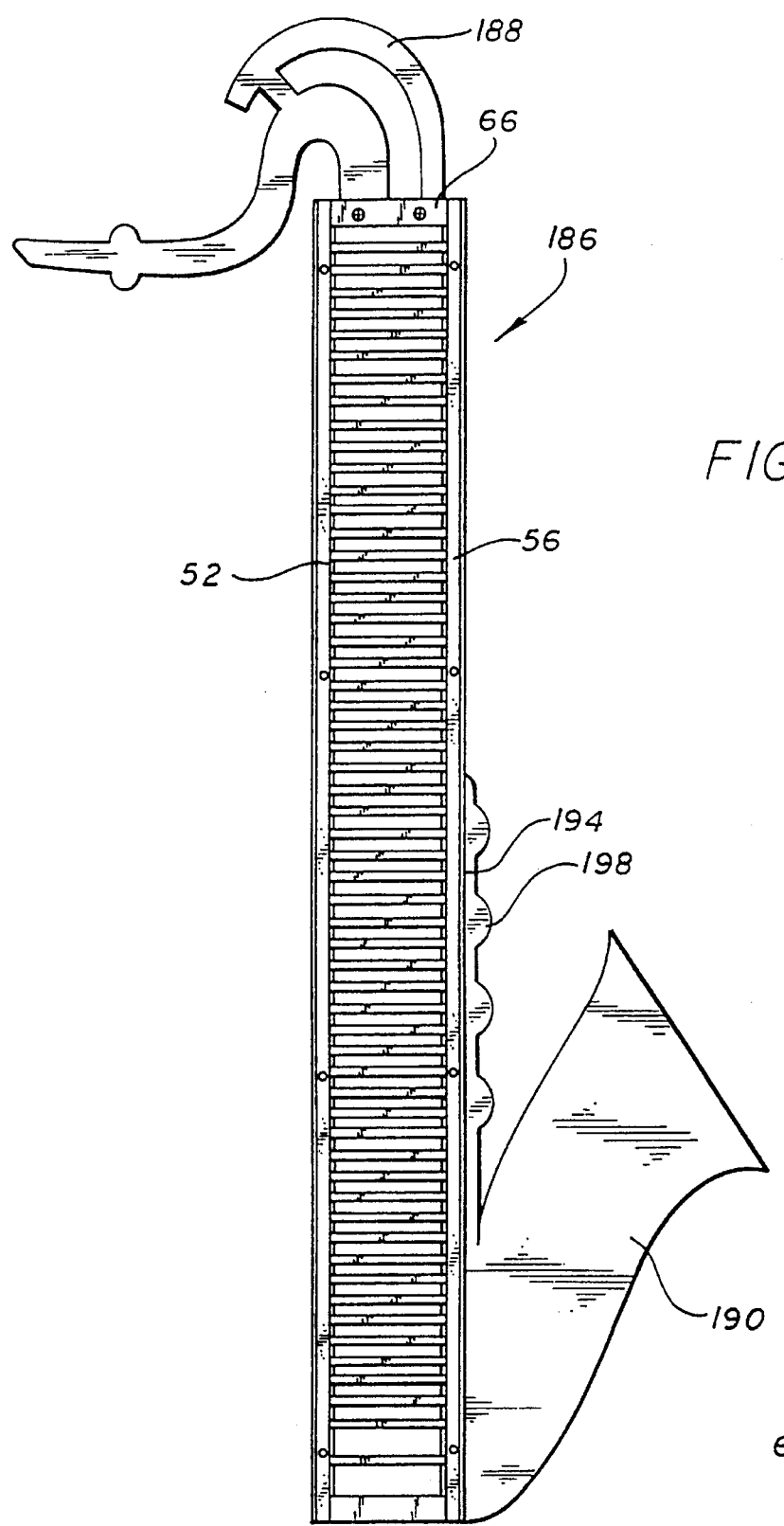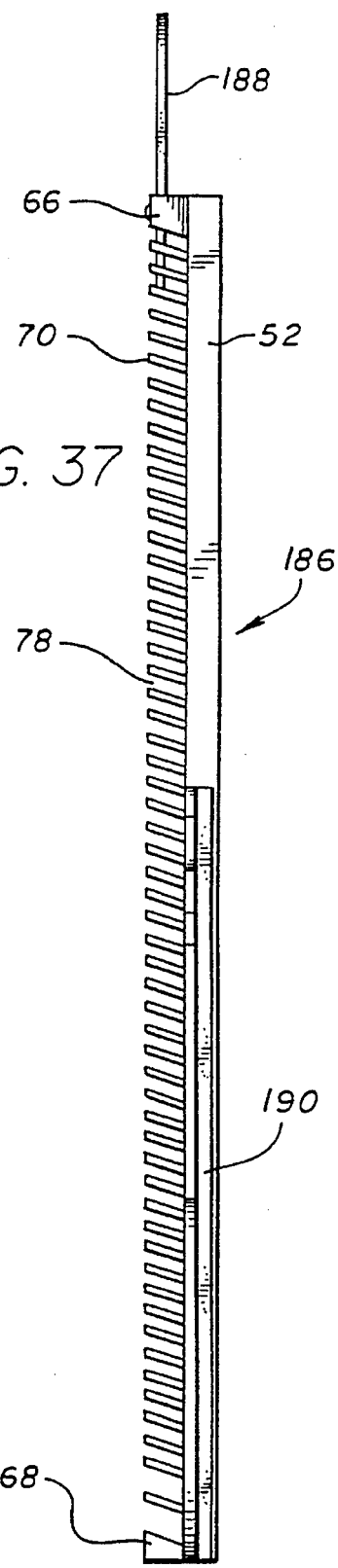

STORAGE AND DISPLAY ASSEMBLY FOR COMPACT DISCS AND THE LIKE

CROSS-REFERENCE TO RELATED APPLICATIONS

This is a continuation-in-part of application Ser. No. 29/017,031, filed Jan. 4, 1994, U.S. Pat. No. D361,917; Ser. No. 29/017,035, filed Jan. 4, 1994, U.S. Pat. No. D361,012; Ser. No. 29/017,090, filed Jan. 4, 1994, U.S. Pat. No. D359,647; Ser. No. 29/017,090, filed Jan. 5, 1994, U.S. Pat. No. D361,465; Ser. No. 08/177,683, filed Jan. 6, 1994; Ser. No. 29/017,825, filed Jan. 21, 1994, U.S. Pat. No. D361,464; and Ser. No. 29/019,744, filed Mar. 9, 1994, U.S. Pat. No. D359,872. The entire contents of each of these applications are hereby incorporated by reference.

BACKGROUND OF THE INVENTION

The present invention relates generally to display or storage racks and units. It more particularly is concerned with assemblies for displaying and storing laser or compact discs, video tapes, audio tapes, cassettes, and game cartridges.

Laser discs, compact discs, video tapes, audio tapes, video cassettes, audio cassettes, game cartridges and the like (hereinafter referred to collectively as "cases" for the sake of brevity) have become extremely popular in recent years, with many households or small businesses owning a hundred or more of them. Numerous systems for conveniently and neatly displaying and storing these cases have thus been developed. An example of a popular system is that shown in U.S. Pat. No. 5,195,642 ('642) of the present inventor. (This patent and all other patents, publications and applications mentioned anywhere in this disclosure are hereby incorporated by reference in their entireties.) Examples of other prior storage units are those shown in the following publications of Atlantic Representations, Inc., of Santa Fe Springs, Calif.: "The Storage Tower Collection—A Unique Modular System," copyright 1992; "Metal Towers—CD, Cassette and VHS Storage System," copyright 1992; "Metal Storage System," copyright 1993; "Atlantic Wholesale Price List, Effective Jan. 1, 1993, No. PRAV93-1;" "Access Collection-Modular Storage System," copyright 1993; and "Wire Storage Racks." Other storage units are shown in "Home Decorator Collection Catalog," Sep. 15, 1992, pages 22 and 23; "Frontgate—Enhancing Your Life at Home," Winter 1994, Model 1108 Floor Lamp/CD Tower; U.S. Pat. No. De. 342,395; U.S. Pat. Nos. 4,819,801, 5,054,626 and 4,911,308; and "CD Man," "Los Angeles Times Magazine," Feb. 6, 1994, page 35. A further example is that shown in the advertisement of Probell Handelsgesellschaft mbh, of Hamburg, Germany, March 1991 (hereinafter "Probell"), which was cited in the '642 patent. Additional patents were cited and/or mentioned in the '642 patent, and all of them are also specifically hereby incorporated by reference.

The '642 patent shows a design wherein the basic storage unit is a tower having opposing frame members with ribs extending between them to define a stack of longitudinally spaced slots, each of these slots being generally horizontally disposed. This patented system can be built in modular units which can be mounted to each other, walls, base units, and/or the like in various patterns. The cross-section of the basic modular unit has a generally pentagonal configuration with the back side open. This configuration provides a very stable tower design, not tending to tip over. When the units are mounted back-to-back on a rotatable base, they can be rotated together and the cases in the alternative first and second units can be accessed as desired. The slots can also be of different sizes, particularly different heights, so that a single storage unit can accommodate cases of different sizes or types, and particularly widths, for example, a thin compact disc case as well as thicker VHS cassette cases.

Aside from the pentagonal shape, another known configuration is a thinner rectangular-type configuration having opposing flanged side members. This configuration is available from Fury Products of Chino, Calif., and is advertised as being "a wall mount CD rack made of solid steel for holding fifty CDs." This design is attractive. However, because of its thin width dimensions it is not stiff, upright and self-supporting even when mounted directly to a base, when mounted back-to-back with a similar unit and then mounted directly to a base, or when a support plate is welded to the bottom thereof. Thus, back wall or outer frame types of supporting structures have been needed to support it. An example of the "back wall" structure is the "Side by Side CD Storage Rack" available from Great! American Oak, of Chino, Calif., and an example of the outer frame structure is the "Swivel Base CD Storage Rack" which is also available from Great! American Oak. These outer frames and back walls configurations can be costly, heavy and/or unattractive.

Thus, an improved assembly construction which provides for a more stable mounting of the upright storage tower to a base is desired. This is particularly so where a thin type of storage unit construction is used, such as the Fury Products design described above.

The known, prior art storage systems further do not provide for the designation of specific different locations for holding "special" cases. These "special" cases can include the user's favorite or most frequently played cases, the currently most popular cases, or the empty outer case itself where the cassette, compact disc, tape or the like has been removed therefrom and is currently being played.

Most of the prior art storage units are configured as straight towers. However, as previously mentioned, the '642 patent discloses how these towers can be attached to each other in various combinations, such as side-by-side, back-to-back, or laterally between parallel columns, and so forth. Further, the top portion of these columns can be configured with a cone-like or pointed shape. However, all of these configurations are basically simple geometrical designs using straight lines. Some people may find these designs to be not particularly interesting or decorative. Further, especially for a single tower, the use of the unit may not be quickly identifiable especially when displayed in a crowded room with other types of furniture. Thus, a more decorative, attractive, and easily identifiable design for display and storage units is desirable.

SUMMARY OF THE INVENTION

Directed to remedying the above-mentioned disadvantages of the prior art, an improved display or storage assembly for cases is herein disclosed. The assembly according to one embodiment thereof includes a vertical storage unit, first and second side members, and a top member. Each of these components can be marketed and provided to the end user disassembled from one another and in a single box. As will be appreciated, providing the assembly in a disassembled condition allows for smaller boxes to be used and thus more compact storage and transport thereof. It further provides for easy replacement of components and substitution of components as needed. It makes the assembly less vulnerable to impact damage in the transport thereof. The components can be assembled together using suitable fasteners such as wood or metal screws, which also provides for the disassembly thereof when needed. However, the present invention also includes providing the entire assembly in an assembled condition and even manufacturing the components together as a single unit.

Although the storage unit preferably will be the above-described thin rectangular type of tower construction, the pentagonal construction of the '642 patent or other tower constructions of the prior art can be used. The top member is secured to the top of the storage unit and the first and second side members are secured to the lower left and right sides of the storage unit, to form the assembly. When thereby secured together the top member, side members, together with the storage unit, define the outline of an easily-recognizable common object, an object which is not a case storage unit. The storage unit itself defines preferably a substantial or discrete portion of this object, such as the trunk or the neck thereof. A preferred design or object is a musical instrument, such as an electric guitar, an acoustic guitar, a banjo, a double-neck guitar or a saxophone. And a preferred musical instrument is a stringed instrument, since the frets of the instrument conveniently correspond to the slots or ribs of the storage unit. Since the cases typically are for musical media, the purpose of the storage assembly is more readily appreciated when the object is a musical instrument. Having this object defined provides for a more attractive display of the storage unit, whether mounted to a wall or to a base. The top and/or side members also form surfaces on which devices can be mounted for holding the "special" cases as discussed above.

When the storage assembly is mounted by itself or with a similar unit in back-to-back relation on a rotatable base, the top member forms a convenient grasping, turning or spinning handle for turning the unit so that the storage unit can be reoriented about a vertical axis as desired.

Further, when the assembly is to be mounted upright to a base the side members can conveniently provide at the lower surfaces thereof additional bracing structure for supporting the tower storage unit upright. The side members can be secured, when made of wood, by wood screws through the base into the lower edge surfaces of the side members. When the side members are made of metal they can be provided with horizontal, rearwardly-disposed lower flanges through which screws or other fasteners can be passed. This bracing function can also be performed without fasteners by simply positioning the side members abutting against and on the base member at a distance spaced outwardly from the base unit and securing the side members then directly and only to the side frame members of the storage unit itself.

In other words, disclosed herein is an assembly for storing and displaying discs, cassettes, game cartridges, tapes and/or the like, including an elongated, straight side-walled storage unit forming one or more vertically upright columns of longitudinally-spaced storage slots. First and second side members are secured to the opposite lower sides of the storage unit and extend out from them. A top member is secured to the storage unit and extends up from it. The side members and top member are configured such that they together with the storage unit define in front view a readily-recognizable outline of a common (non-storage unit) object, such as a guitar or other musical instrument, and particularly a double-neck electric guitar. The slots or ribs of the storage unit define, when the object is a stringed musical instrument, the frets thereof. An interesting, attractive and readily-identifiable storage and display assembly is thereby defined. The side and/or top members can also provide surfaces to which holders for holding special tapes or cases are face mounted. The entire assembly can be mounted flat against a wall or upright to a base. When mounted to a base, the side members themselves can be directly secured to the base to further brace and support the elongated storage unit upright on the base. Alternatively, another similar storage unit can be mounted back-to-back to the storage unit, both mounted to a rotatable base and the top member used as a turning member for turning the units on the base.

According to one embodiment an assembly for storing and displaying compact discs and the like includes first and second storage units. The first storage unit has first and second elongated, spaced side frame members, a first top connector extending between the first and second side frame members at tops thereof, a plurality of first ribs attached to the first and second side frame members and spaced longitudinally relative thereto to thereby form a first column of receiving first slots, each adapted to hold a compact disc case therein. The second storage unit similarly has third and fourth elongated, spaced side frame members, a second top connector extending between the third and fourth side frame members at tops thereof, a plurality of second ribs attached to the third and fourth side frame members and spaced longitudinally relative thereto to thereby form a second column of receiving second slots, each adapted to hold a compact disc case therein. The second column is securable in a secured position parallel to the first column. A first top member is releasably securable to the first top connector in a secured position extending generally upwardly from the first column, and a second top member is releasably securable to the second top connector in a secured position extending generally upwardly from the second column. A first side member is releasably securable to the first side member in a secured position extending laterally out from a lower portion of the first storage unit, and a second side member in turn is releasably securable to the fourth side member in a secured position extending laterally out from a lower portion of the second storage unit. The first top member, the second top member, the first side member, and the second side member are configured such that when in their respective secured positions they, together with the first and second storage units, define at least a substantial portion of a readily recognizable outline of a common, non-storage unit object, such as a double-neck electric guitar.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a perspective view of (a base-mounted acoustic guitar) storage assembly of the present invention.

FIG. 2 is a front elevational view thereof, with a portion of the figure broken away for illustrative purposes.

FIG. 3 is a side elevational view thereof, with various cases shown inserted therein.

FIG. 4 is a perspective view of another (an acoustic guitar) embodiment of the present invention, shown mounted in position to a wall.

FIG. 8 is a perspective view of a further (an electric guitar) embodiment of the present invention, shown mounted in position to a wall.

FIG. 9 is a rear elevational view thereof.

FIG. 10 is a left side elevational view thereof.

FIG. 11 is a right side elevational view thereof.

FIG. 12 is a top plan view thereof.

FIG. 13 is a bottom plan view thereof.

FIG. 14 is a perspective view thereof, showing a base mounted embodiment thereof.

FIG. 16 is a cross-sectional view taken on line 16—16 of FIG. 9.

FIG. 17 is a front elevational view of a further (a first saxophone) embodiment of the present invention.

FIG. 18 is a perspective view of a further (a double-sided acoustic guitar) embodiment.

FIG. 19 is a front elevational view thereof.

FIG. 20 is a rear elevational view thereof.

FIG. 21 is a right side elevational view thereof; the left side elevational view being a mirror image thereof.

FIG. 24 is a perspective view of a further (a double-sided, rotatable base-mounted electric guitar with a "special" case holder) embodiment.

FIG. 25 is a front view of an embodiment similar to that of FIG. 24 but without the holder and with the rotatable base shown with phantom lines.

FIG. 29 is a front elevational view of a further (a banjo) embodiment.

FIG. 30 is a right side elevational view thereof; the left side elevational view being a mirror image thereof.

FIG. 36 is a rear elevational view thereof.

FIG. 37 is a left side elevational view thereof.

DETAILED DESCRIPTION OF THE PREFERRED EMBODIMENTS

Figure 5:
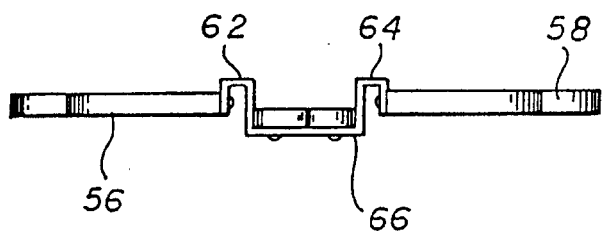
FIG. 5 is a top plan view thereof.

Referring to the drawings, preferred embodiments of the present invention will now be described in detail. It is understood that when a variation or modification is shown in one figure that it can be employed in the other embodiments as would be apparent to those skilled in the art and in various combinations thereof. For example, the "special" case holder shown in FIG. 2 can be adapted and used in any of the other embodiments. Similarly, the double-sided, the base mounted, or the wall mounted variations can be used on embodiments other than those on which they are illustrated in the drawings. Additionally, the assembly can be configured to define objects other than the musical instruments as depicted in the drawings and the objects as mentioned at the end of this disclosure as would be apparent.

Figure 15:
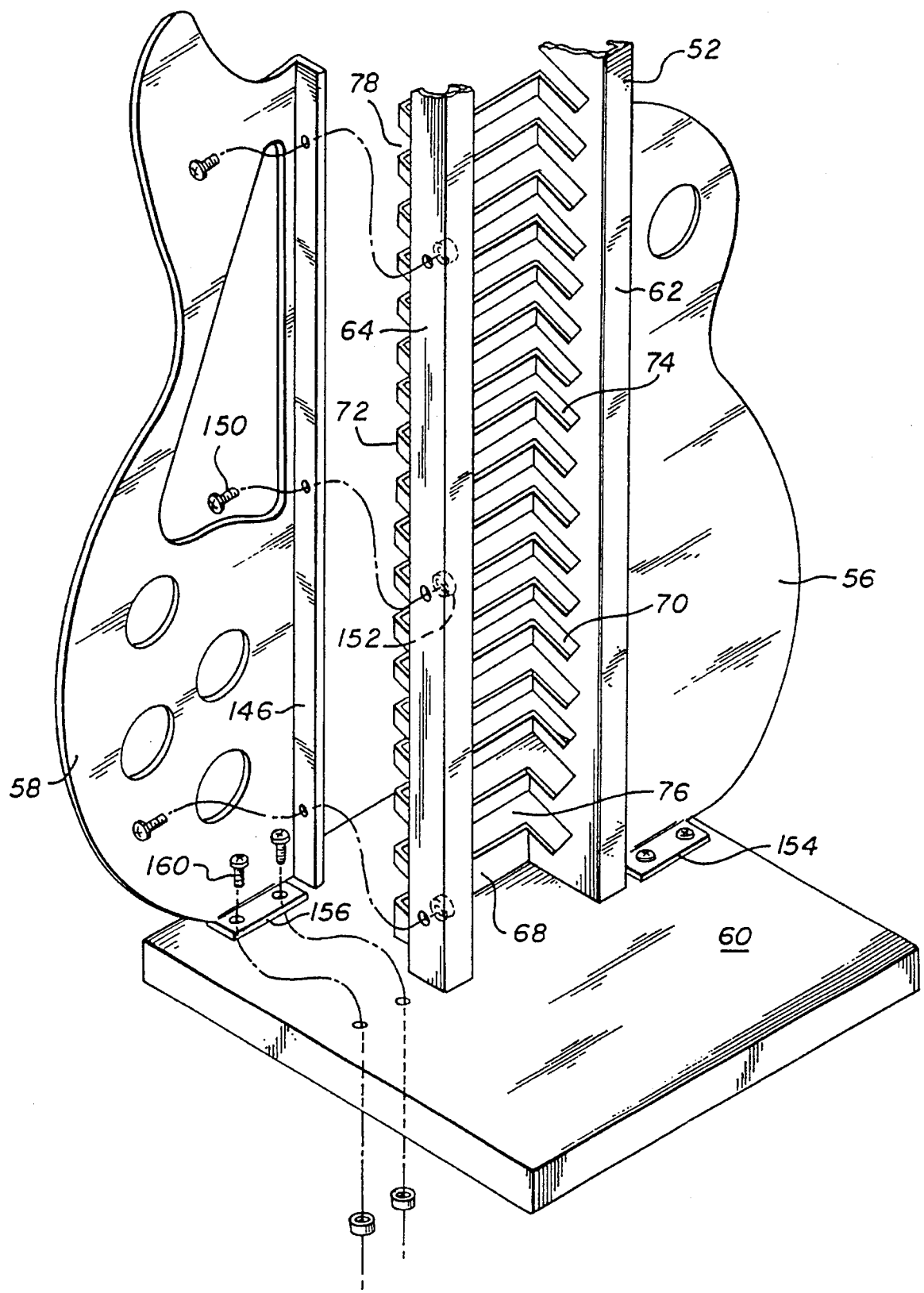
FIG. 15 is a rear, exploded perspective view of the bottom portion of the embodiment of FIG. 14, depicting assembly (or disassembly) thereof.

FIGS. 1 through 3 depict a first storage assembly embodiment of the present invention generally at 50. Assembly 50 includes an upright storage unit 52, a top member 54, a first side member 56, a second side member 58, and a base unit 60. The storage unit 52, as depicted, is that known in the prior art and as mentioned above in the "Background of the Invention" section of this disclosure. It includes first and second spaced side frame members 62, 64, a top connector member 66, a bottom connector member 68, and a plurality of spaced ribs 70 extending between the first and second frame members. As shown in FIG. 15, for example, each of the ribs 70 includes side portions 72, 74 slanted forward and upward (or horizontally) and a middle lateral connecting portion 76. Each of the ribs 70 is spaced one from another thereby defining inclined (or horizontal) slots 78 for receiving cases rearwardly (and downwardly) therein. Examples of these cases are shown in FIG. 3 at 80 and 82. Referring thereto it is understood that the slots 78 can be of different sizes and/or widths to accommodate small cases 80, as well as larger cases 82 or more than one small case.

The side frame members 62, 64 are configured as U-shaped channels, as will be apparent from the later-discussed top and bottom views of similar embodiments. The entire storage unit 52 is made from solid steel. The storage unit 52 according to one preferred embodiment has fifty-eight slots 78, and another has fifty slots. However, any number of slots 78 as would be practical and desirable can be used. The slots (78) can all be of the same height and width dimensions or of different dimensions as shown in copending design application, Ser. No. 07/909,802, filed Jul. 2, 1992, for example, which embodiment has been commercially available from Atlantic, Inc. of Santa Fe Springs, Calif., as "The Favorites Tower," since 1992.

Although the thin rectangular cross-sectional shape storage unit 52 is depicted in the figures and is a preferred configuration, it is within the scope of the invention to use generally any type of tower storage unit. For example, the pentagonal design of the '642 patent or the Probell design can be used. Also, instead of the ribs 70 extending between the two frame members 62, 64, short opposing ribs each attached to only one frame member, such as shown in U.S. Pat. Nos. 4,655,345 and 4,453,785, can be used. Alternatively, receiving slots can be cut or otherwise formed in the opposing inside faces of the frame members (62, 64) for receiving and holding the side edges of the cases. However, by having the ribs 70 extend between the two frame members 62, 64, especially for a tall elongated tower structure, the ribs advantageously form additional cross bracing and connectors between and for the frame members.

The top member 54 and the first and second members 56, 58 can be formed of any suitable material. An example of such a material is wood such as shown in the embodiment of FIGS. 1 through 3, or steel as shown in other figures. The first and second members 56, 58 are placed in an abutting relation with the lower edges of the frame members 62, 64 and then secured thereto, for example as by using screws 86, such as shown in FIG. 2. Screws 85 pass out through the outer lips 88, 89 of the U-shaped frame members 62, 64 and in through the side edges of the first and second side members 56, 58. The top member 54 is similarly secured with screws 87 or other fasteners to the top connector member 66. Alternatively, the side members (56, 58) and/or the top member (54) can be formed as a continuous back wall to which the rear surface of the storage unit (52) is mounted. Although this back wall embodiment may need more (wood or steel) material, it may be easier to produce than the separate member embodiment(s).

Figure 23:
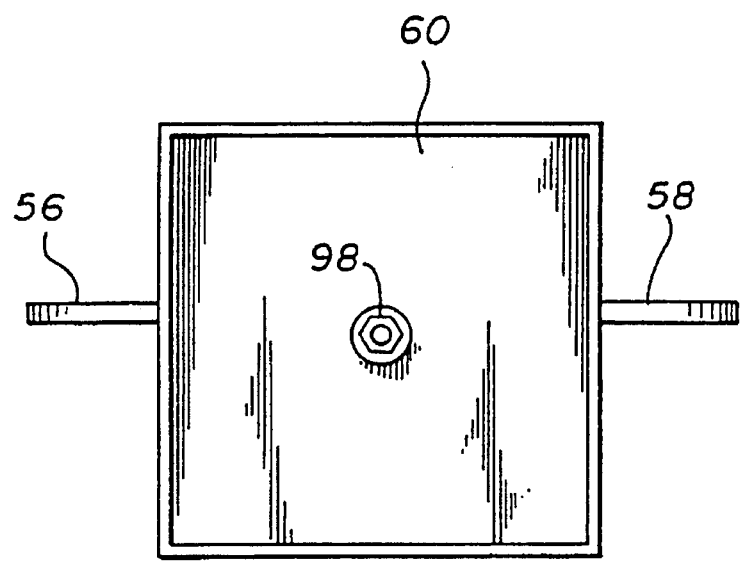
FIG. 23 is a bottom plan view thereof.
Figure 26:
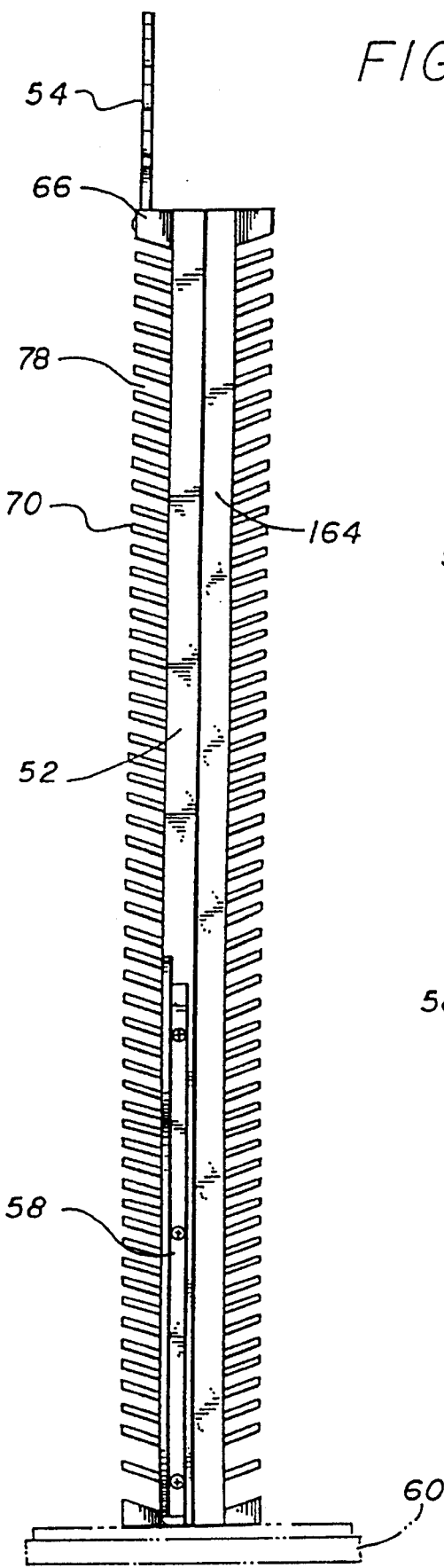
FIG. 26 is a right side elevational view thereof.
Figure 27:
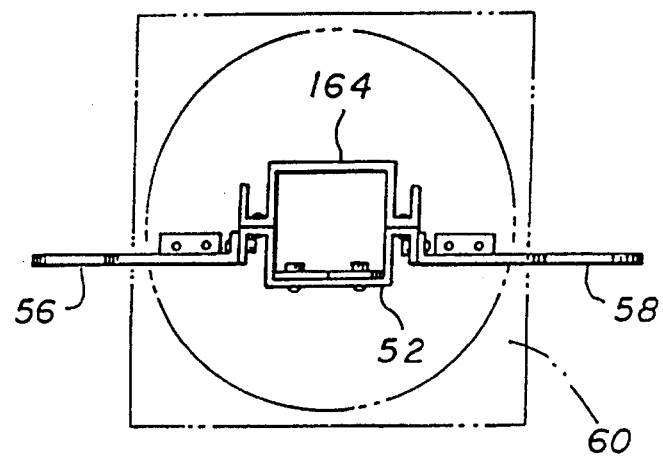
FIG. 27 is a top plan view thereof.
Figure 28:
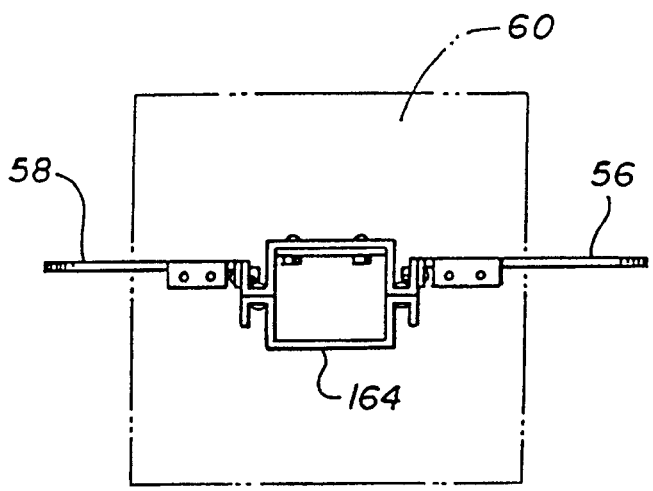
FIG. 28 is a bottom plan view thereof.
Figure 31:
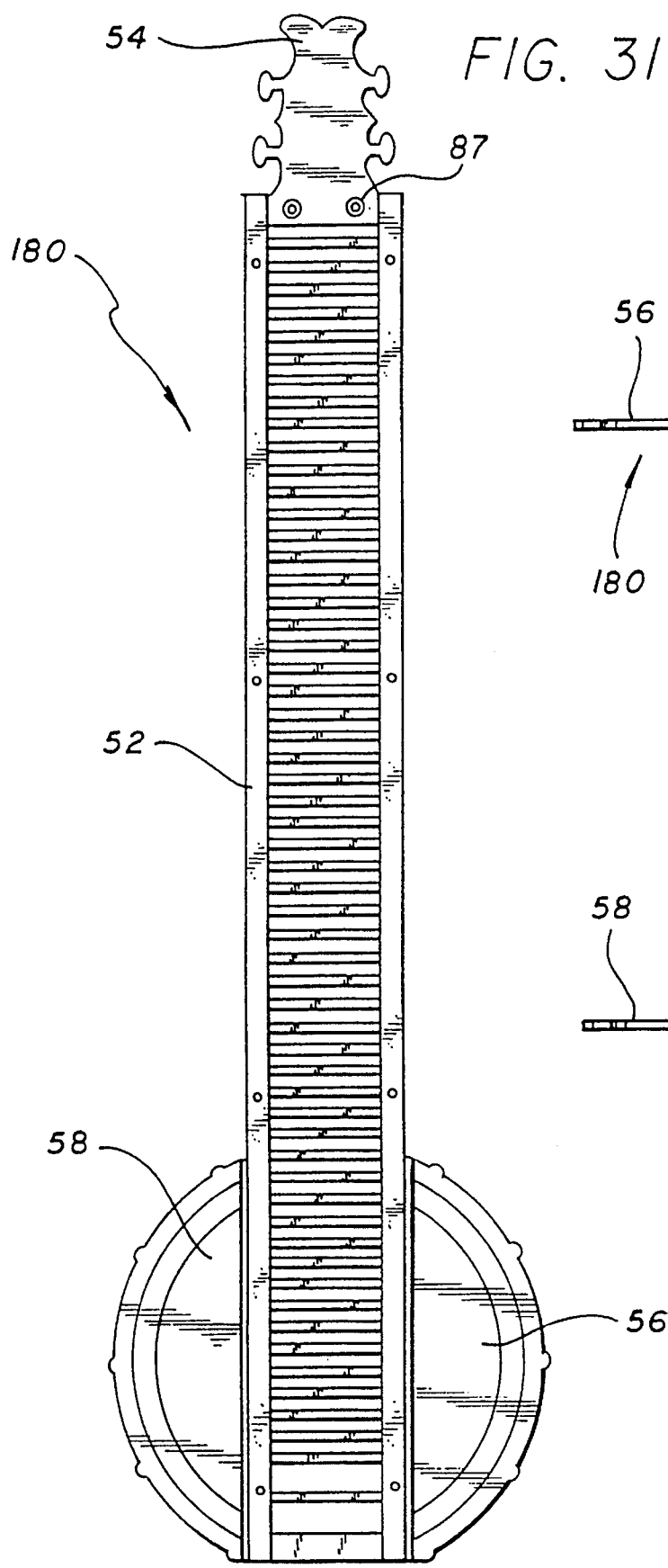
FIG. 31 is a rear elevational view thereof.
Figure 32:
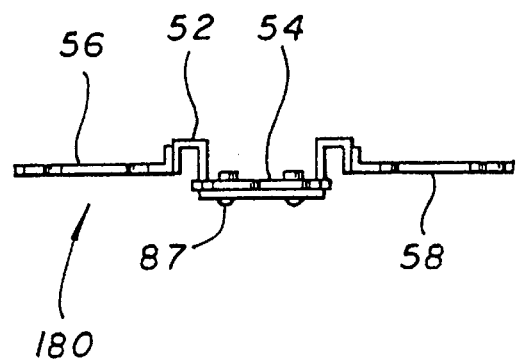
FIG. 32 is a top plan view thereof.
Figure 33:
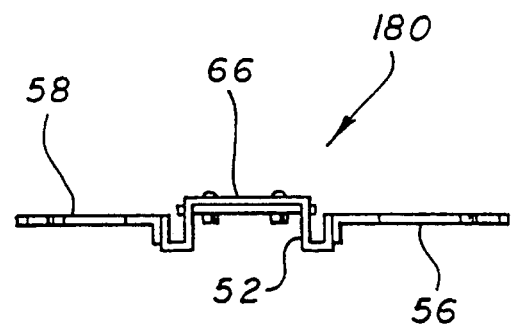
FIG. 33 is a bottom plan view thereof.
Figures 34, 35:
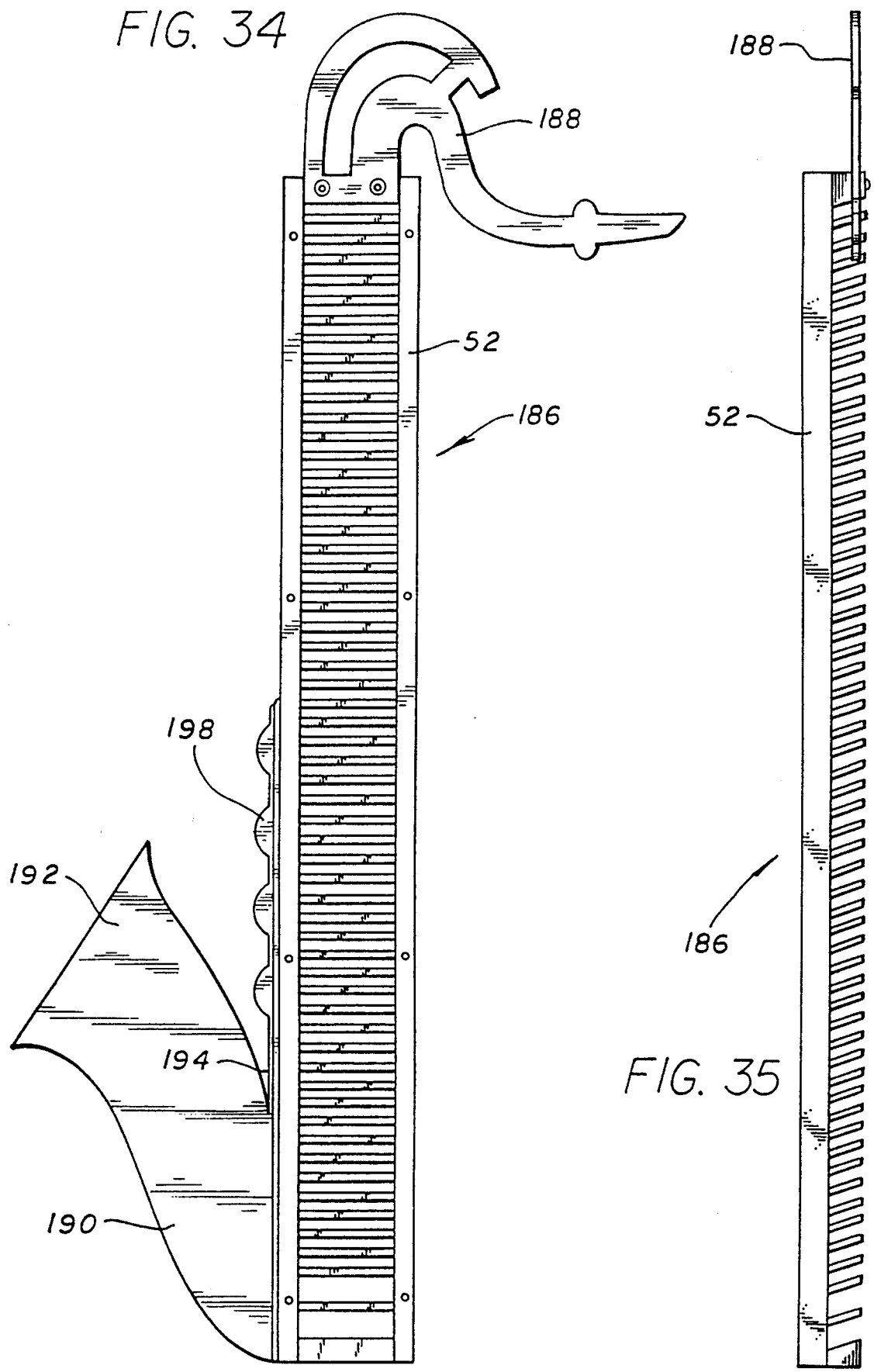
FIG. 34 is a front elevational view of a further (a second saxophone) embodiment.
FIG. 35 is a right side elevational view thereof.
Figure 38:
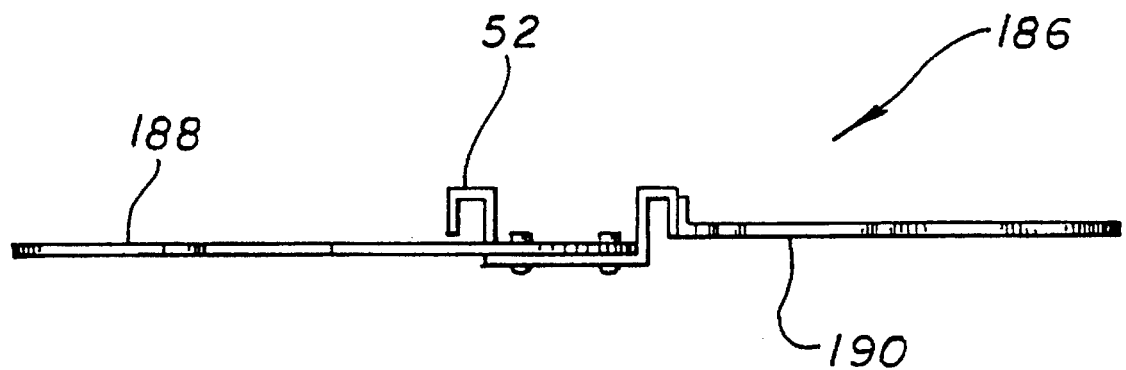
FIG. 38 is a top plan view thereof.
Figure 39:
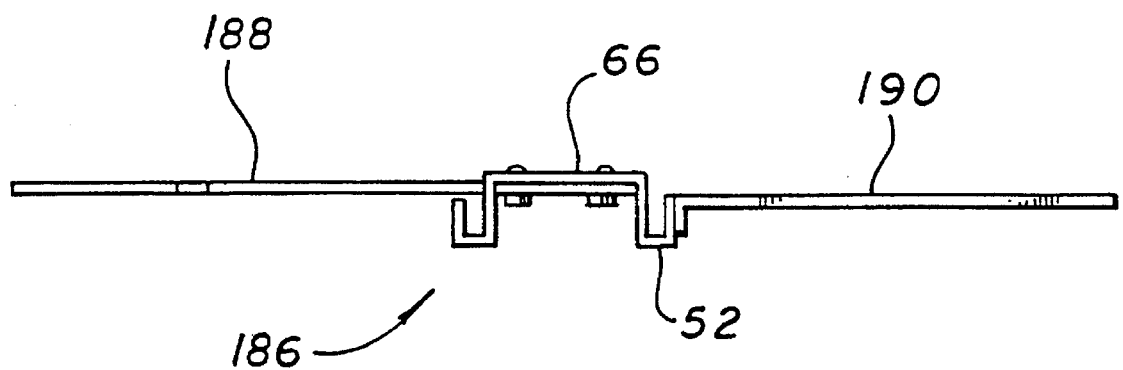
FIG. 39 is a bottom plan view thereof.
Figure 40:
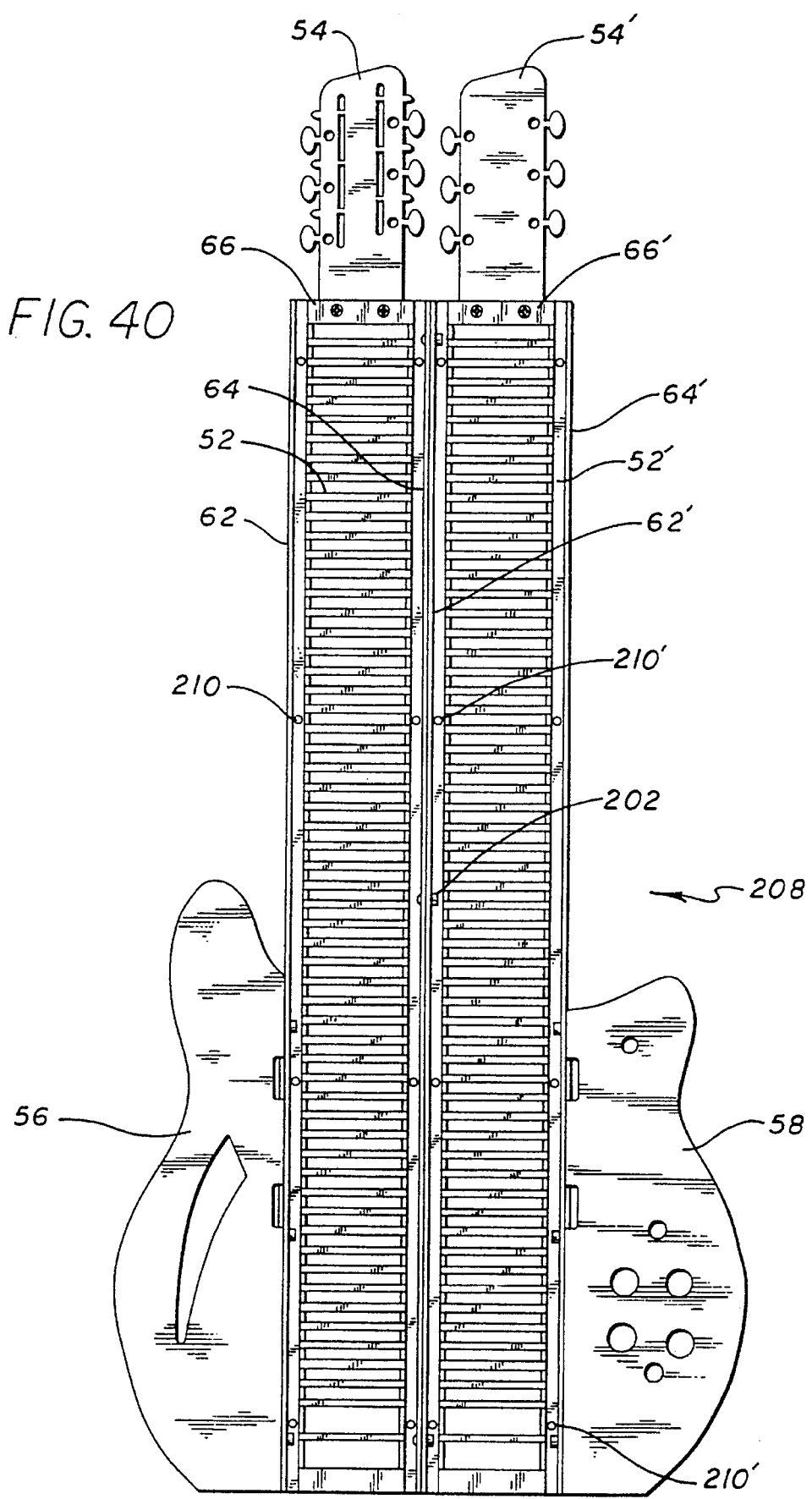
FIG. 40 is a front elevational view of a further (a double-neck electric guitar) embodiment.
Figure 41:
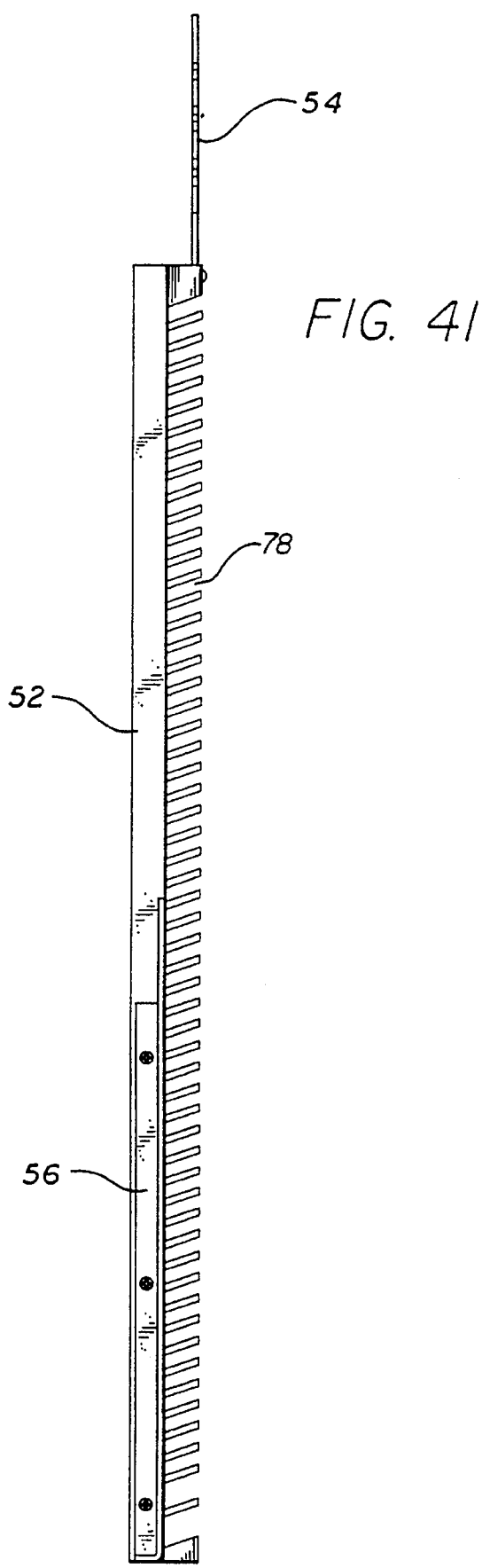
FIG. 41 is a right side elevational view thereof.
Figure 42:
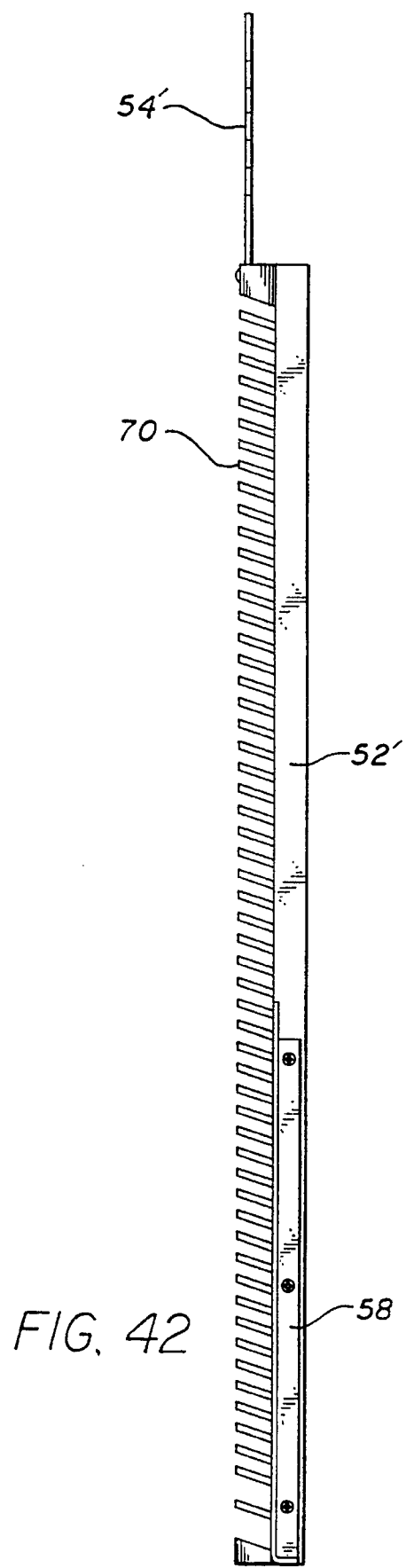
FIG. 42 is a left side elevational view thereof.
Figure 43:
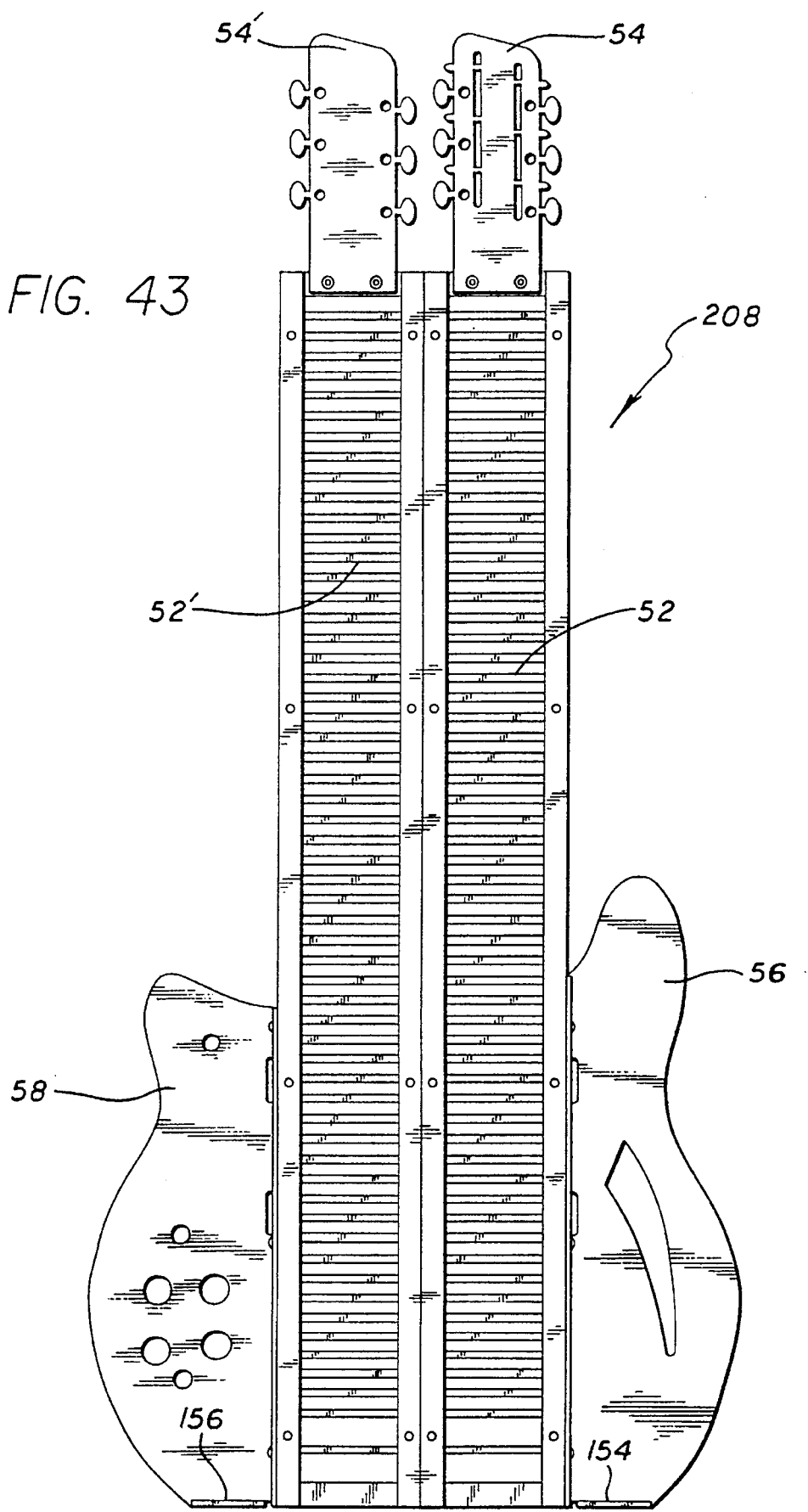
FIG. 43 is a rear elevational view thereof.
Figure 44:
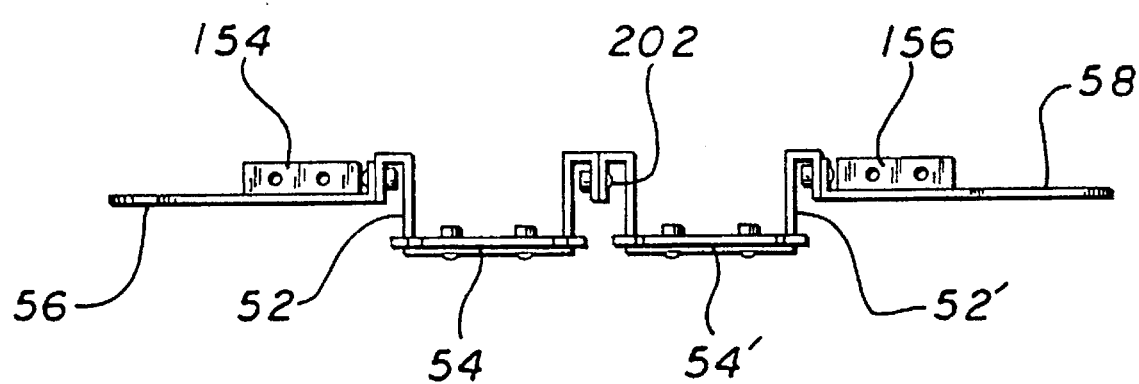
FIG. 44 is a top plan view thereof.
Figure 45:
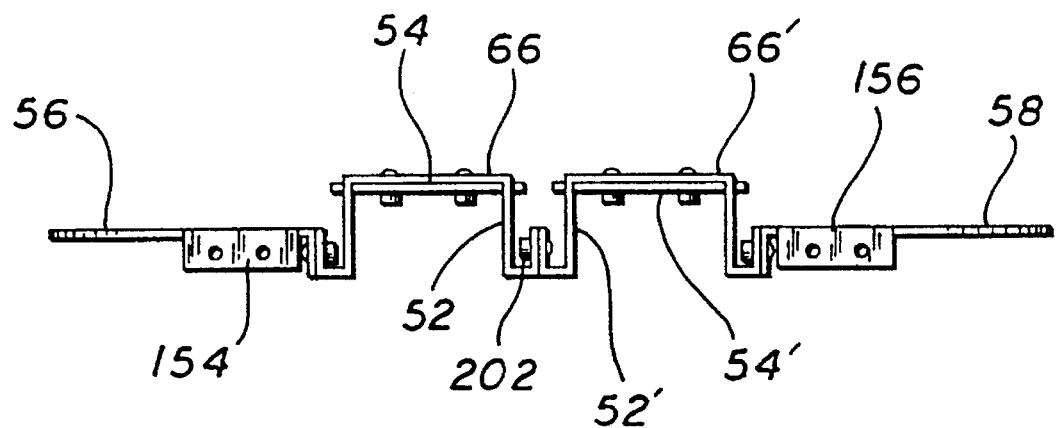
FIG. 45 is a bottom plan view thereof.

FIGS. 1 through 3 show an embodiment which is mounted to a base 60, and particularly a rotatable base. The embodiment of FIGS. 1 through 3 is a single-sided storage unit embodiment (as compared with the double-sided embodiments of FIGS. 18 and 24, for example). A base which is rotatable is usually not needed for the single-sided embodiment, however. The rotatable base 60 when used can be a "Lazy Susan" type construction, a construction such as illustrated in U.S. Pat. No. 3,543,943, or the swivel base such as illustrated in the "Storage Tower Collection" publication by Model No. 1211. It can essentially include a top plate 90 and a spindle 92 connected to the top plate with the top plate and the spindle being supported by and in a top opening of a base member 96, and held in place by a screw or nut 98 as shown in FIG. 23.

The top member 54, first side member 56, and second side member 58 each have front faces. The front faces can define generally broad planar surfaces to which holders 102 can be mounted for holding in flat upright orientation the "special" cases 104 as defined above. One construction of these holders 102 includes a pair of flexible clips 106 secured at their bottom ends to a horizontal plate strip 108 and having their upper ends 110 being free. Thus, the cases 104 can be slipped down in between the free ends 110 and the member face and into position as shown in FIGS. 1 through 3 with the resilient clips 106 holding the cases releasably in position against the member faces. A similar holder 112 can be provided on the top member 54, as shown. Thus, holders can be provided (a) on all of the top member 54, the first side member 56 and the second side member 58, (b) on two of these members, (c) on one of them, or (d) on none of them, as desired.

Referring again to FIGS. 1 and 2, it is seen that the combination of the top member 54, the first side member 56, the second side member 58 and the storage unit 52, given their relative configurations and positionings clearly and quickly defines the outline of an acoustic guitar. The top member 54 defines the tuning head portion of the guitar, the first and second side members 56, 58 define the hollow guitar body portion, the storage unit 52 defines the neck of the guitar, and conveniently the ribs 70 define the frets thereof.

FIGS. 4 through 7 show a storage assembly embodiment of a slightly differently shaped guitar. In particular, the top member 54 has (the guitar string) slots 116 and the small outer projections 118 form the tuning keys, screws or knobs of the guitar. Similarly, small openings 120 are formed in the first and second side members 56, 58 about a third of the way down from the top portions thereof and adjacent the connection to the storage unit 52. These form, in front view, the acoustical openings to the hollow guitar base.

Figure 6:
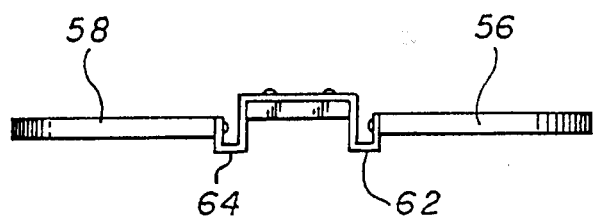
FIG. 6 is a bottom plan view thereof.
Figure 7:
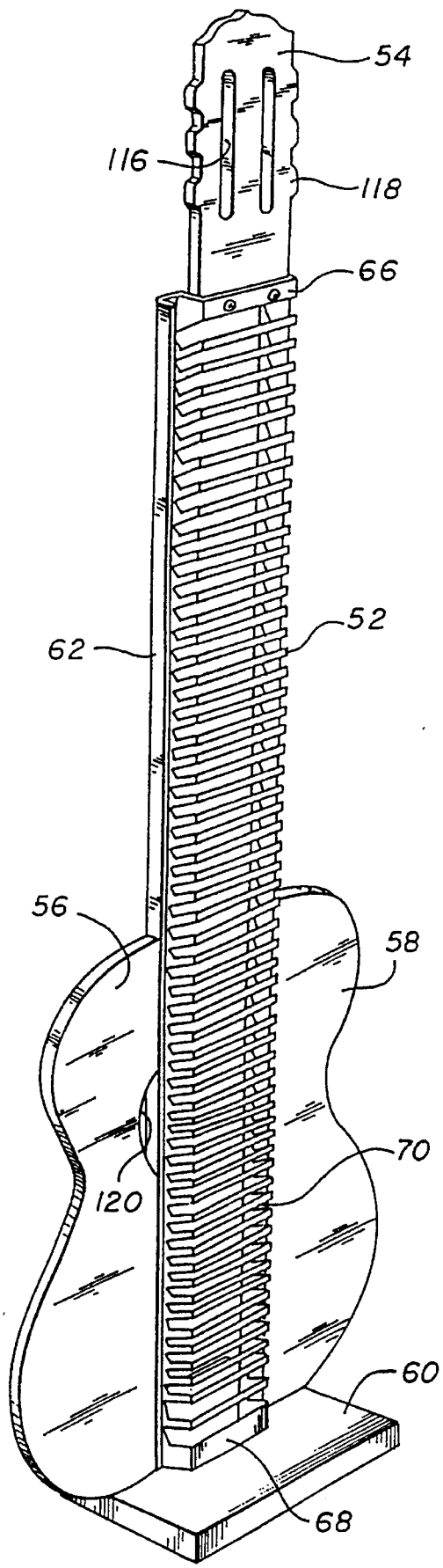
FIG. 7 is a perspective view of the embodiment of FIG. 4, shown mounted on a base.

The cross-sectional configuration of the storage unit 52 is with its U-shaped first and second side frame members 62, 64 and showing the connections of the top member 54 and the first and second side members 56, 58 to the storage unit as illustrated in FIGS. 5 and 6. The embodiment of FIG. 4 shows the storage assembly 50 mounted to a wall 124. This mounting can be by connecting fasteners through openings in the storage unit 52. Alternatively, the storage assembly 50 can be mounted to or can include a base unit 60, as shown in FIG. 7, so that it is thereby free-standing. Again, one or more of the storage unit 52, the first side member 56, and the second side member 58 can be directly mounted at their lower edges directly to the top of the base unit 60. It is expected that all three will be directly secured thereto, but this is not necessarily required. Even if the first and second side members 56, 58 are not directly secured to the base unit 60, by directly abutting them against the base unit at distances spaced out from the frame members 62, 64, they provide a side-to-side bracing function for the upright storage unit 52.

FIGS. 8 through 14 illustrate generally at 130 an electric guitar embodiment of the present invention. In particular, the top member 54 has holes 132 and outwardly-projecting tuning knobs 134 similar to that of an electric guitar. The first and second side members 56, 58 are not mirror images of each other, unlike the embodiments of the previous figures. Rather, similar to the typical electric guitar the first side member 56 has a top hole 136, and the second side member 138 has a curved stubbed portion 140, a generally triangular opening 142, and four lower openings 144. A preferred version of the electric guitar embodiment forms each of the top member 54, first side member 56 and second side member 58 out of steel, and each is formed in a tool die stamping process. Referring to FIGS. 15 and 16, the first and second side members 56, 58 both have, on their inside vertical surfaces, rearwardly projecting flanges 146, through which metal screws 150 or similar fasteners can pass into the outer flanges of the respective side frame members 62, 64, and held in place by nuts 152. Similarly, bottom flanges 154, 156 are provided along the lower surfaces of the side members 56, 58 and have holes down through which fasteners 160 can pass when the storage assembly 50 is to be mounted to a base plate 60, as shown in FIG. 14.

It is expected that the storage assembly 50 will be marketed to the customer or ultimate user thereof in a disassembled condition with each of the components including the screws and the base member, if any, packed in a single box (not shown). By distributing it in a disassembled condition it allows for a smaller packing box to be used, it reduces the likelihood that any of the outwardly extending components will be broken off, and it eliminates a manufacturing step for the producer. Assembly by the user is extremely easy, and this can be understood from FIGS. 15 and 16, for example. Written instructions (not shown) can be provided in the box to assist the user in assembling the storage assembly 50. They are probably not needed though since the assembly steps would be apparent from the components themselves and the assembled picture (not shown) typically provided on the cover of the box. In any event, the disassembled components are shown in FIG. 15 with the relative alignments and screw insertions illustrated, and FIG. 16 shows a cross section of a typical screw connection. Aside from screws other fastening means can be used, such as by gluing, tying, holding, nailing, and welding.

Figure 22:
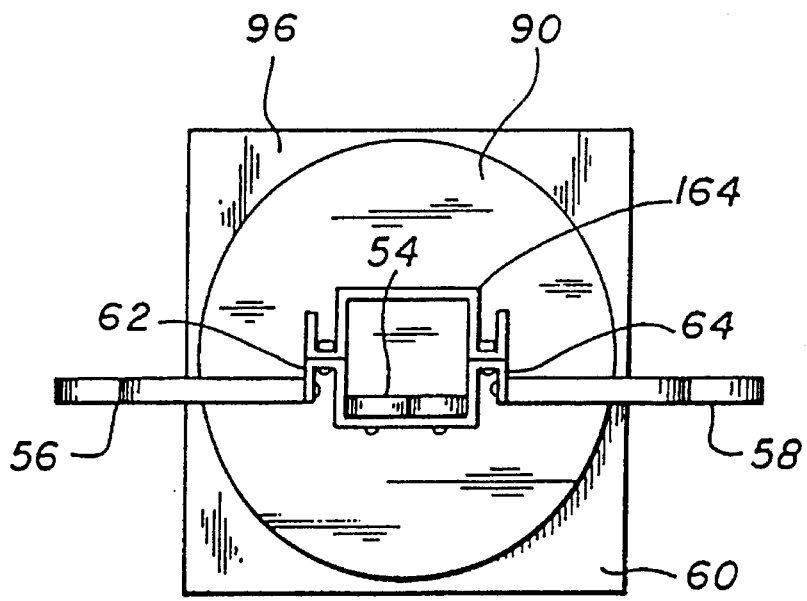
FIG. 22 is a top plan view thereof.

As previously mentioned, the storage assembly of the present invention can also be a two-sided version as shown in FIGS. 18 through 21, generally at 162. Storage assembly 162 is similar to the embodiment of FIG. 4, for example, but with a second storage unit 164 provided and secured in back-to-back relation with screws through the middle portions of the U-shaped flanges connecting the back-to-back units. The two storage units 52, 164 will typically be connected back-to-back together before (or after) the connection of the top member 54 and first and second side members 56, 58 to the first storage unit 52. The back-to-back storage units 52, 164 are secured to a rotatable base 60 such as previously discussed, and the back-to-back relationship mounted to the rotatable base 60 is shown in FIG. 22. FIG. 23 is simply a bottom view of the assembly of FIG. 22 showing the connector screw and nut 98 for connecting the rotatable base 90 to the bottom base 96.

A two-sided electric guitar embodiment is shown in FIGS. 24 through 28 generally at 170, with the version of FIG. 24 having a special case holder 102 mounted on the first side member 56. Since assembly 170 is two-sided, it is preferably mounted on a base 60 which is rotatable to forwardly position the desired side. Additional construction, configuration and operation details of assembly 170 can be understood from the previously-described embodiments of the other figures.

FIGS. 1 through 16 and 18 through 28 show storage assembly embodiments of the present invention wherein guitar shapes are defined. It is expected that the guitar shape, whether an acoustic guitar or an electric guitar, and other stringed musical instruments will be the preferred designs. This is because they take good advantage of the configuration of the storage unit 52 itself, defining with its straight parallel frame members 62, 64 the neck of the instrument and with its ribs 70, the frets thereof. Since the "cases" will typically include or relate to musical media, it is expected that the object outlined by the present storage assembly will preferably be a musical instrument.

In addition to stringed musical instruments, an example of an alternative defined musical instrument is the saxophone as illustrated in FIG. 17 generally at 170. It is seen there that only one side member 56 is used and it defines the horn portion 172 of the saxophone. Side member 56 further includes a surface extending along the top portion of the mounting base and thereby providing a bracing function for the storage unit 52. The top member 54 is configured to define an angled mouthpiece 176, which angles to the opposite side of the storage unit 52 as the horn portion 172. In addition to depicting a saxophone, this opposite side positioning provides for a more balanced design for the storage assembly (170). It is noted that for the saxophone embodiment 170 as well as the guitar and banjo embodiments that the top(s) of the first (and second) side member(s) 54, 56 is (or are) spaced a distance well below the top of the storage unit 52 and in fact below the middle of the storage unit.

A banjo is depicted by the embodiment of FIGS. 29 through 33 generally at 180. Similar to many of the previously-described embodiments, it includes (i) a top member 54, which is configured to resemble a banjo tuning head and is secured with screws 87 to the top connector member 66 and (ii) first and second side members 56, 58, which are screwed to the lower sides of the first and second side frame members 62, 64 and project outwardly therefrom to define the round resonating body or sound box portion of the banjo. The storage unit 52 defines the neck of the banjo, and the ribs 70 (or slots 78) define the frets thereof.

Another saxophone embodiment is shown in FIGS. 34 through 39 generally at 186. Similar to saxophone embodiment 170, it includes a top member 188 configured to define a more elaborately curving reed mouthpiece and secured to the top connector member 66 and a (first or second) side member 190 configured in part to define the curved conical metal tube 192 and secured to the first side member 56. The side member 190 also includes an elongated portion 194 extending up from the inside of tube 192 and having projections 198 defining the keys, buttons or valves of the saxophone. The tube 192 and the elongated member 194 are preferably formed as a single (metal) unit.

A pair of storage units 52, 52' can be positioned parallel to one another, and preferably adjacent one another, and secured together with screws or similar fasteners 202 through adjacent side frame members 64, 62' as illustrated in FIGS. 40 through 45. (Elements of unit 52' corresponding to those of unit 52 have the same reference numeral followed by a prime (') designation.) The first and second side members 56, 58 are then secured to lower portions of the outer side frame members 62, 64' of the adjacent storage units 52, 52' and secured thereto with screws or the like. This forms a pair of vertically upright (when viewed from the side) columns of slots. Two top members 54, 54' are provided in the embodiment of FIGS. 40 through 45; one top member 54 is secured to the top connector member 66 of one storage unit 52 and the other member 52' is secured to the top connector member 66' of the other storage unit 54'. The object defined in this embodiment shown generally at 208 is a double-neck electric guitar wherein the first and second side members 56, 58 define the guitar base (similar to that of FIG. 8, for example), the first unit 52 defines one neck, the first top member 54 defines the tuning head at the top of that neck, the second unit 52' defines the other neck, and the second top connector member 54' defines the tuning head at the top of the other neck. The slots or ribs 78, 70, 78', 70' in both of the storage units 52, 52' form the frets on both of the necks, and so forth.

If desired, one or more spacer members (not shown) can be provided between the storage units 52, 52' at lower locations thereof. This spaces the storage units 52, 52' apart similar to the spacing of the necks of functioning double-neck guitars as are commercially available. This spacer, however, adds an extra component to the assembly 208 as well as extra assembly steps. It also is probably a slightly less stable design than the direct unit-to-unit attachment, as illustrated in the drawings.

The first and second side members 56, 58 both have bottom flanges 154, 156 for mounting the assembly to a base (60). This mounting with screws or other fasteners (160) through the flanges and into the base (60) is a sufficiently secure mounting such that neither of the storage units 52, 52' themselves needs to be directly secured to the base. Instead of mounting the assembly 208 to a base (60), it can be mounted to a wall (124) or other vertical surface as with screws or bolts through openings 210, 210' in the storage units 52, 52'. One preferred order for assembling the assembly 208 together is: (a) top member 54 to unit 52; (b) top member 54' to unit 52; (c) side member 56 to unit 52; (d) side member 58 to unit 52'; (e) units 52 and 52' together; (f) side member 56 to base (60); and (g) side member 58 to base (60). Other assembly steps or orderings thereof are apparent to those skilled in the art and are included herein.

Modifications can be made to assembly 208 similar to the previously-described embodiments. For example, additional storage units can be mounted back-to-back to those illustrated and the entire assembly mounted to a rotatable base (60), similar to assembly 170 in FIG. 24 for example. Special case holders such as holder 102 can be used. Also, the top members 54, 54' need not be secured directly to the top connectors 66, 66' but can otherwise be mounted, as to the side frame members. Both side members 56, 58 may not be needed for certain designs (similar to the saxophones of FIGS. 17 and 32). Similarly, both top members 54, 54' may not be needed. Alternatively, a single top member spanning the tops of both storage units 52, 52' can be used. Additionally, more than two storage units may be used and assembled as suggested in the '642 patent, for example.

These configurations, pursuant to this invention, take advantage of the shape and configuration of the storage unit (52) itself. Thus, the storage unit (52) and particularly the side members (54, 56) thereof, can define a connector member, a neck, a trunk or similar straight portion(s) of the object represented. Examples of other objects which can be depicted or represented by the assembly (50) are trees (particularly palm trees where the ribs resemble the generally horizontal lines in or the texture of the bark and the enlarged rounded side members define the bulbous-like base of the trunk), and fluid containers (such as beer bottles, wine bottles, wine glasses, cocktail glasses and water glasses, where the storage unit (52) defines a drinking straw in or the neck of the container). For sports enthusiasts, the object defined can be golf clubs, baseball bats, swords, rifles, tennis rackets or basketball hoops and stands. Other objects of this invention include skyscrapers, space rockets, lamps, violins (with or without the bow), trumpets, keyboards, microphones with stands, humans and other animals (such as giraffes where the storage unit forms the long neck and/or legs). These objects or the outlines or profiles thereof, or at least substantial portions thereof, are typically and preferably defined when the assembly (50) is viewed from the front elevational perspective. It is within the scope of the invention though to construct the assembly so to define the object when the assembly is viewed from other angles, such as from the top, bottom or side(s) thereof.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. An assembly for holding and displaying cases, said assembly comprising:

a first storage unit including first and second elongated, spaced side frame members, a first top connector extending between said first and second side frame members at tops thereof, a plurality of first ribs attached to said first and second side frame members and spaced longitudinally relative thereto to thereby form a first column of receiving first slots, each adapted to hold a case therein;

a second storage unit including third and fourth elongated, spaced side frame members, a second top connector extending between said third and fourth side frame members at tops thereof, a plurality of second ribs attached to said third and fourth side frame members and spaced longitudinally relative thereto to thereby form a second column of receiving second slots, each adapted to hold a case therein, said second column being securable in a secured position parallel to said first column;

at least one top member releasably securable to at least one of said first and second top connectors in a secured position extending generally upwardly from at least one of said first and second columns;

a first side member releasably securable to said first side frame member in a secured position extending laterally out from a lower portion of said first storage unit; and a second side member releasably securable to said fourth side frame member in a secured position extending laterally out from a lower portion of said second storage unit;

wherein said at least one top member, said first side member, and said second side member are configured such that when in their respective secured positions they, together with said first and second storage units, define at least a substantial portion of a readily-recognizable outline of a common, non-storage unit object;

wherein said at least one top member includes a first top member releasably securable to said first top connector in a secured position extending generally upward from said first column and a second top member releasably securable to said second top connector in a secured position extending generally upward from said second column; and wherein the object is a double-neck electric guitar.

2. The assembly of claim 1 wherein said second and third side frame members are directly side-by-side adjacent one another.

3. The assembly of claim 2 wherein said second and third side frame members are secured directly to one another.

4. The assembly of claim 1 further comprising base means for supporting said first and second storage units upright.

5. The assembly of claim 4 wherein said first and second side frame members abut said base means.

6. The assembly of claim 5 wherein said first and second side members are directly securable to said base means.

7. The assembly of claim 1 wherein said first side member includes a lower, rearwardly-disposed connector flange to connect said first side member upright to an assembly base and said second side member includes a lower, rearwardly-disposed connector flange to connect said second side member upright to the assembly base.

8. The assembly of claim 1 further comprising mounting means for mounting said first and second storage units in position to an upright surface.

9. The assembly of claim 1 wherein the case is a compact disc case.

10. The assembly of claim 1 wherein said slots form frets of the double-neck electric guitar.

11. The assembly of claim 1 wherein each of said first ribs extends between and is secured at opposite ends thereof to both of said first and second frame members, and each of said second ribs extends between and is secured at opposite ends thereof to both of said third and fourth frame members.

12. The assembly of claim 1 wherein said first storage unit forms a first neck of the double-neck electric guitar, said second storage unit forms a second neck of the double-neck electric guitar, and said first and second side members form at least substantially a body of the double-neck electric guitar.

13. The assembly of claim 1 wherein said first and second side members each comprise a flat plate.

14. The assembly of claim 1 wherein the double-neck electric guitar has a guitar body having at least one central element, and at least one of said first and second side members has a through-opening configured and positioned to form said at least one central element.

15. A storage assembly for holding selectively disc cases, tapes, cartridges or cassettes, said assembly comprising:

a storage unit including first and second side frame members and a plurality of ribs attached to and extending laterally between said side members and spaced longitudinally to thereby form a plurality of receiving slots, each said slot being adapted to hold selectively the disc cases, tapes, cartridges or cassettes;

a top portion secured to said storage unit and extending up from a top thereof;

a first side portion secured to said storage unit and extending laterally out from a lower portion thereof; and a second side portion secured to said storage unit and extending laterally out from a lower portion thereof on an opposite side as said first side portion;

wherein said top portion, said first and second portions and said storage unit are configured and positioned relative to one another such that in a front elevational view they together define at least a substantial portion of a readily-recognizable shape of a banjo.

16. The assembly of claim 15 wherein the banjo has a banjo body, a neck, a tuning head and frets, and wherein said first and second side portions define at least a substantial portion of the banjo body, said storage unit defines at least a substantial portion of the neck, said top portion defines at least a substantial portion of the tuning head, and said ribs form the frets.

17. The assembly of claim 15 wherein said first side portion is releasably securable to said first side frame member, said second side portion is releasably securable to said second side frame member, and said top portion is releasably securable to said storage unit.

18. An assembly for storing compact discs, comprising:

an elongate storage unit including first and second side frame members and a plurality of ribs attached to and extending laterally between said side frame members and spaced longitudinally to thereby form a plurality of slots, each for holding and storing at least one compact disc;

a top portion extending up from a top of said storage unit; and a side portion spaced a distance from said top portion and extending laterally out from said storage unit;

wherein said top portion, said side portion and said storage unit are configured, dimensioned and positioned relative to one another such that in an assembly front elevational view they together define at least a substantial portion of a readily-recognizable shape of a common, non-compact disc storage unit object which has a body and a head; and wherein said top portion is configured to form the object head.

19. The assembly of claim 18 wherein said side portion defines a first side portion, and further comprising a second side portion extending laterally out from said storage unit on an opposite side as said first side portion, said second side portion forms a portion of the object shape.

20. The assembly of claim 19 wherein said first side portion is releasably securable to said first side frame member, said second side portion is releasably securable to said second side frame member, and said top portion is releasably securable to the top of said storage unit.

21. The assembly of claim 20 wherein said first and second side portions and said top portion are all releasably securable to said storage unit with bolts or screws.

22. The assembly of claim 20 wherein said first and second side portions each comprise flat plates having flanged connector edges.

23. The assembly of claim 20 wherein said storage unit includes a top connector member secured to and extending between said first and second side frame members, and said top portion is releasably securable directly to said top connector member.

24. The assembly of claim 23 wherein said top connector member includes a central flat face general parallel to a plane of said frame members, and said top portion is releasably secured flat to said face.

25. The assembly of claim 20 wherein said first side portion includes an angled flange portion which is directly and releasably securable to said first side frame member and said second side portion includes an angled flange portion which is directly and releasably securable to said second side frame member.

26. The assembly of claim 19 wherein the object is a guitar.

27. The assembly of claim 19 wherein the object is a banjo.

28. The assembly of claim 18 wherein the object is a saxophone.

29. The assembly of claim 18 wherein the saxophone includes an enlarged horn portion and an elongated portion including saxophone valve keys, said side portion forms the horn, and the elongated portion extends along and parallel to said first side frame member.

30. The assembly of claim 18 wherein said storage unit forms at least a portion of the object body.

31. The assembly of claim 18 wherein the object has an object neck, and said storage unit forms at least a portion of the object neck.

32. The assembly of claim 18 wherein the object has a plurality of head central elements, and said top portion has a plurality of through-holes forming the head central elements.

33. The assembly of claim 18 wherein the object head is a musical instrument tuning head.

34. The assembly of claim 18 wherein said assembly is adapted to be mounted in its operable position to a wall.

35. The assembly of claim 18 wherein said side portion extends laterally out from a lower portion of said storage unit.

36. The assembly of claim 18 wherein said first and second side frame members form a substantial portion of an outline of the object.

* * * * *